US012792345B2

(12) United States Patent
Ghosh et al.

(10) Patent No.: US 12,792,345 B2
(45) Date of Patent: Nov. 10, 2026

(54) ACCELERATING KECCAK ALGORITHMS

(71) Applicant: Intel Corporation, Santa Clara, CA (US)

(72) Inventors: Santosh Ghosh, Hillsboro, OR (US); Christoph Dobraunig, St. Veit an der Glan (AT); Manoj Sastry, Portland, OR (US); Andrew H. Reinders, Portland, OR (US); Regev Shemy, Kiryat Ata (IL); Qian Wang, Portland, OR (US); Rotem Ohana Peretz, Kfar Zeitim Lower Galili (IL); Wing Shek Wong, Austin, TX (US); Wajdi Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/145,744

(22) Filed: Dec. 22, 2022

(65) Prior Publication Data

US 2024/0211253 A1 Jun. 27, 2024

(51) Int. Cl.
*G06F 9/30* (2018.01)

(52) U.S. Cl.
CPC ................................ *G06F 9/30029* (2013.01)

(58) Field of Classification Search
CPC .................................................. G06F 9/30029
See application file for complete search history.

(56) References Cited

U.S. PATENT DOCUMENTS 9,081,562 B2 7/2015 Asaf et al.
2013/0275722 A1* 10/2013 Yap ...................... H04L 9/0643 712/208
2014/0095844 A1* 4/2014 Gopal ................ G06F 9/30036 712/223

(Continued)

OTHER PUBLICATIONS

Rawat, Hemendra, and Patrick Schaumont. "Vector instruction set extensions for efficient computation of keccak." IEEE Transactions on Computers 66, No. 10 (2017): 1778-1789. (Year: 2017).*

(Continued)

*Primary Examiner* — Keith E Vicary
(74) *Attorney, Agent, or Firm* — Nicholson De Vos Webster & Elliott LLP

(57) ABSTRACT

A method comprises fetching, by fetch circuitry, an encoded parity instruction comprising at least one opcode, a first source identifier for a first source, a second source identifier for a second source, a third source identifier for a third source, and a destination identifier for a destination, decoding, by decode circuitry, the encoded parity instruction to generate a decoded parity instruction; and executing, by execution circuitry, the decoded parity instruction to retrieve operands representing a first register from the first source, a second register from the second source, a third register from the third source, and an index from the third source, perform an XOR operation of four words of data from the first register and single word of data from the second register in a position represented by the index to generate a parity value, and store the parity value in a the first register in a position represented by the index.

15 Claims, 20 Drawing Sheets

(56) References Cited

U.S. PATENT DOCUMENTS

| | | | | |
|---|---|---|---|---|
| 2014/0095845 | A1* | 4/2014 | Gopal | G06F 9/30036 712/223 |
| 2016/0266965 | A1* | 9/2016 | B | G06F 11/108 |
| 2017/0180131 | A1* | 6/2017 | Ghosh | G06F 21/75 |
| 2020/0117811 | A1* | 4/2020 | Ghosh | G09C 1/00 |
| 2021/0216318 | A1 | 7/2021 | Langhammer et al. | |
| 2023/0004387 | A1 | 1/2023 | Madduri et al. | |

OTHER PUBLICATIONS

Bertoni, Guido et al., "The Keccak Reference", Version 3.0, Jan. 14, 2011, pp. 1-69.

Extended European Search Report, EP App. No. 23207951.7, Apr. 3, 2024, 10 pages.

Rawat et al., "SIMD Instruction Set Extensions for Keccak with Applications to SHA-3, Keyak and Ketje", ACM, Jun. 18, 2016, 8 Pages.

* cited by examiner

500

ACCELERATING KECCAK ALGORITHMS

BACKGROUND

Subject matter described herein relates generally to the field of computer security and more particularly to processor hardware and instructions to accelerate KECCAK algorithms.

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The detailed description is described with reference to the accompanying figures.

DETAILED DESCRIPTION

Figure 1:
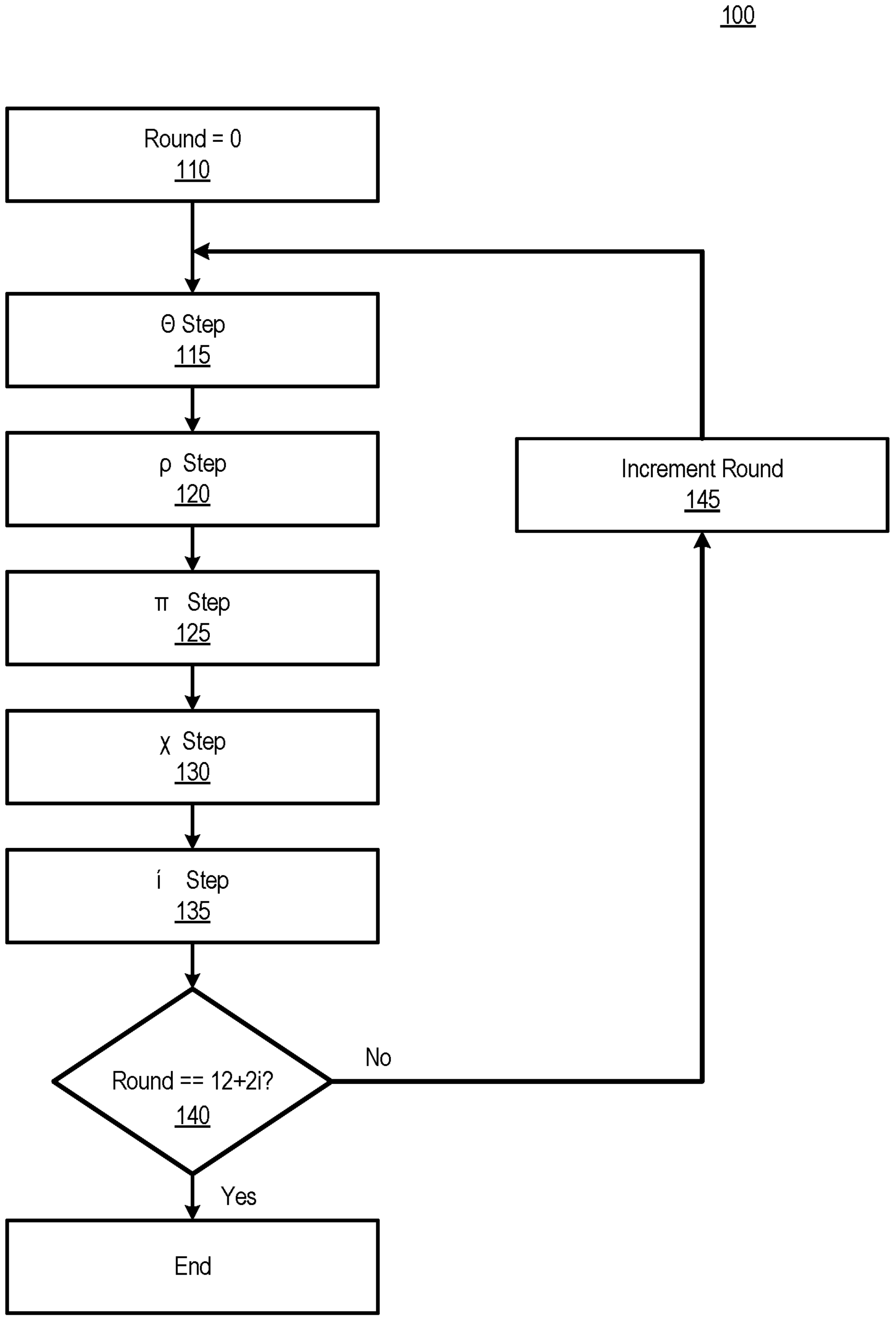
FIG. 1 is a simplified flow diagram of operations implemented in a KECCAK permutation, in accordance with some examples.

Described herein are exemplary systems and methods to accelerate post-quantum cryptography algorithms. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C).

Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

SHA3 is a NIST standard with a wide range of applications. Amongst others, it is used as a component of many candidates for future Post-Quantum Cryptography standards like Crystals-Kyber for Key Encapslulation Mechanism (KEM) and Crystals Dilithium for Digital Signatures (DS). If such PQC schemes are based on SHA3, a large percentage of the computation time is spent on SHA3.

To address these and other issues, provided herein are new instructions to accelerate internal sub-operations involved in SHA3/Keccak round function. These instructions are based on AVX2 registers that accelerate execution of complex bit manipulations and byte reordering on 1600 bits Keccak state. A new SHA3-PAR instruction accelerates 64-bit parity computations on five 64-bit words. The SHA3-TXR1 and SHA3-TXR2 instructions compute the Theta and Rho steps of the KECCAK permutation atomically. The SHA3-PI accelerates the byte rearrangements within an entire Keccak state. Finally, SHA3-CHI1 and SHA3-CHI2 efficiently compute the Chi step on a single Keccak state.

FIG. 1 is a simplified flow diagram of operations implemented in a KECCAK permutation, in accordance with some examples. Referring to FIG. 1, in some examples a KECCAK computation performs iterations of a Theta (Θ) step 115, a Rho (ρ) step 120, a Pi (π) step 125, a Chi (χ) step 130, and an Iota (ι) step 135. For standard SHA3, l=6 and so it has 24 rounds which are applied on 1600-bit state, so a loop is implemented using the counter set in operation 110, the test applied in operation 140, and the increment operation applied in operation 145.

Figure 2A:
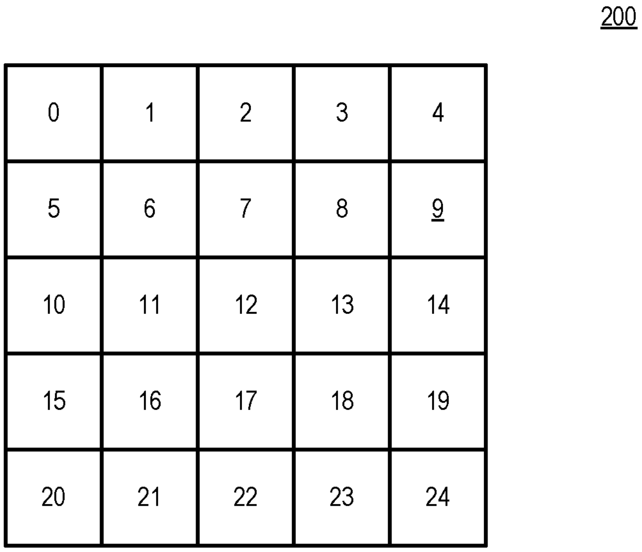
FIG. 2A is a schematic block diagram illustrating a state representation of a SHA-3 computation, in accordance with some examples.

FIG. 2A is a schematic block diagram illustrating a state representation of a SHA-3 computation, in accordance with some examples. In some examples, the state variable includes 25 words of 64-bit each as shown in FIG. 2A. This two-dimensional state for keccak 1600 of 5×5 64-bit words may be represented as:

x=0 . . . 4 and y=0 . . . 4

For internal memory representation convert 2D to 1D index i=5y+x

Figure 2B:
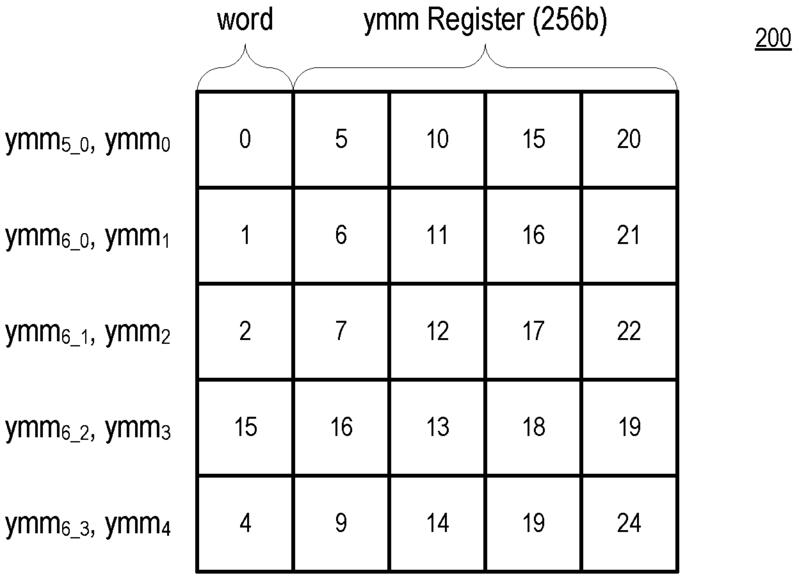
FIG. 2B is a schematic block diagram illustrating a state representation of a SHA-3 computation, in accordance with some examples.
Figure 2C:
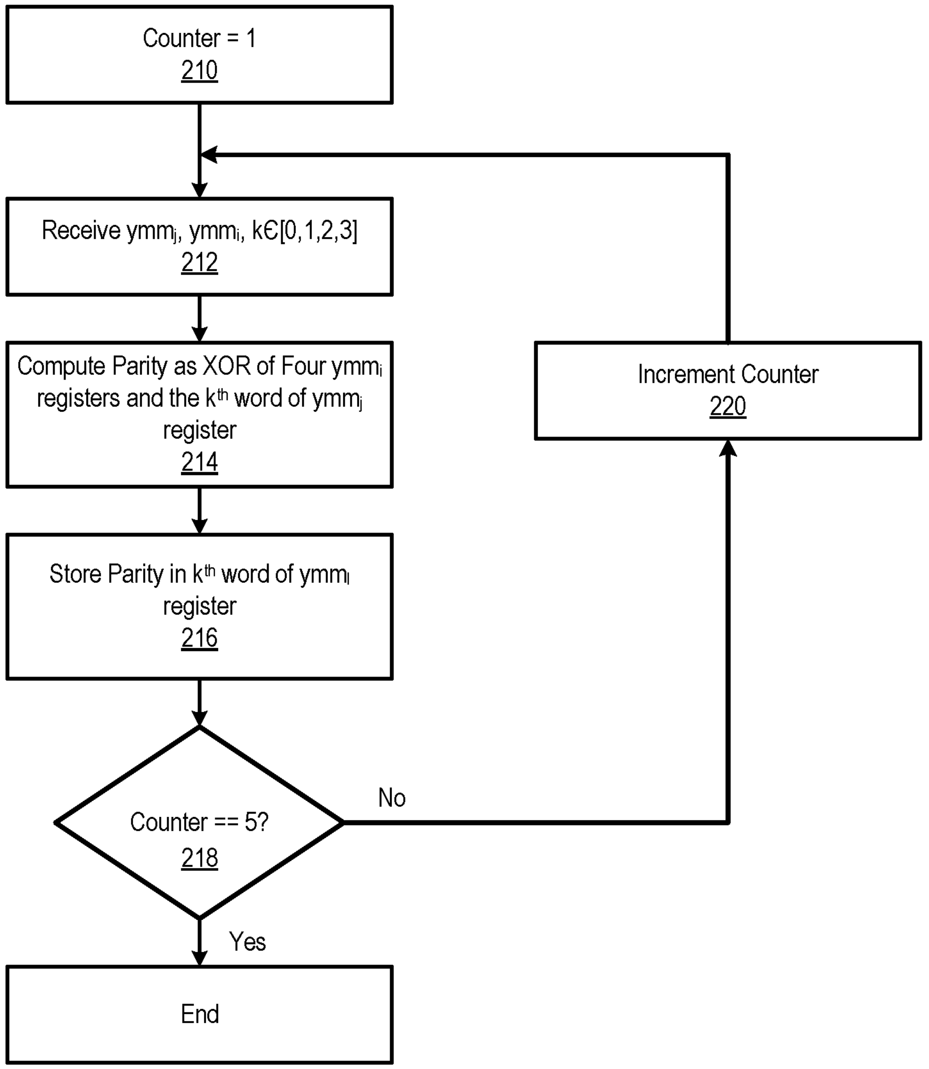
FIG. 2C is a flowchart illustrating operations in a method to execute a parity calculation for a SHA-3 computation, in accordance with some examples.

Referring to FIG. 2B, the operation for C[x] computation represents the column parity computation, which XORs five columns and generates their parities. FIG. 2C is a flowchart illustrating operations in a method to execute a parity calculation for a SHA-3 computation, in accordance with some examples. In some examples, the operations depicted in FIG. 2C represent the parity calculation portion of the Theta (Θ) step of the KECCAK permutation depicted in FIG. 1. The Theta (Θ) step modifies the state variable A as follows:

$$[x] = A[x, 0] \oplus A[x, 1] \oplus A[x, 2] \oplus A[x, 3] \oplus A[x, 4], \forall\, x \text{ in } 0 \ldots 4$$

$$D[x] = C[x-1] \oplus ROT(C[x+1], 1), \forall\, x \text{ in } 0 \ldots 4$$

$$A[x, y] = A[x, y] \oplus D[x], \forall\, (x, y) \text{ in } (0 \ldots 4, 0 \ldots 4)$$

In some examples an instruction (SHA3-PAR) may be defined to compute these parities, as follows:

SHA3-PAR $$ymm_l = SHA3\text{-}PAR(ymm_j, ymm_i, k):$$

Input: $ymm_j$, $ymm_i$, k∈[0, 1, 2, 3]

Computes: the parity—XOR of five words (4 of $ymm_i$ and the $k^{th}$ word of $ymm_j$)

Five invocations of SHA3-PAR are required to compute five 64b parities for the five columns of the state represented in FIG. 2. The results are stored in two different ymm registers where one of them stores 4 parities and another one stores 1 parity, as follows:

1. $ymm_7$=SHA3-PAR($ymm_5$, $ymm_0$, 0)
2. $ymm_8$=SHA3-PAR($ymm_6$, $ymm_1$, 0)
3. $ymm_8$=SHA3-PAR($ymm_6$, $ymm_2$, 1)
4. $ymm_8$=SHA3-PAR($ymm_6$, $ymm_3$, 2)
5. $ymm_8$=SHA3-PAR($ymm_6$, $ymm_4$, 3)

FIG. 2C is a flowchart illustrating operations in a method to execute a parity calculation for a SHA-3 computation, in accordance with some examples. Referring to FIG. 2C, at operation 210 a counter is initialized to 1. At operation 212 the operands $ymm_j$, $ymm_i$, k∈[0, 1, 2, 3] are received as inputs. At operation 214 the parity value is calculated as the XOR of five words (4 of $ymm_i$ and the $k^{th}$ word of $ymm_j$). At operation 216 the parity value calculated in operation 214 is stored in the $k^{th}$ word of the $ymm_j$ register. If, at operation 218 the counter has not increased to 5 then operation 220 is implemented and the counter is incremented and operations 212-216 are repeated until the counter reaches 5, thereby completing the five invocations of the SHA-3 required, as described above.

After computing the parities, next part of the Theta (Θ) step and the Rho (ρ) step are computed through combined instructions overall execution latency of the Keccak round function. In some examples a first instruction (SHA3-TRX1) may be defined to compute these parities, as follows:

SHA3-TXR1:

Input: $ymm_i$, $ymm_j$, $ymm_k$, #id1 ∈[1, 2, 3, 4, 5, 6]

Output: updated $ymm_i$ register, with A[x,y] of Eq1 after specific left-rotation of the ρ-step where #id1 represents two things:

I. Left and right parity words indices in $ymm_j$ and $ymm_k$ registers

II. Number for left rotations for each word [3,2,1, and 0] after XORing the word with parities

#id1 in 6 instructions are:

#1: [3, 0] [36, 3, 41, 18], #2: [0, 1] [44, 10, 45, 2], #3: [0, 2] [6, 43, 15, 61], #4: [1, 3] [55, 25, 21, 56], #5: [2, 0] [20, 39, 8, 14], #6: [3, 0] [0, 0, 0, 0]

In some examples six invocations of the instruction are required, as follows:

1. SHA3-TXR1 ($ymm_0$, $ymm_8$, $ymm_8$, #1)
2. SHA3-TXR1 ($ymm_1$, $xmm_7$, $ymm_8$, #2)
3. SHA3-TXR1 ($ymm_2$, $ymm_8$, $ymm_8$, #3)
4. SHA3-TXR1 ($ymm_3$, $ymm_8$, $ymm_8$, #4)
5. SHA3-TXR1 ($ymm_4$, $ymm_8$, $xmm_7$, #5)
6. SHA3-TXR1 ($ymm_5$, $ymm_8$, $ymm_8$, #6)

Figure 2D:
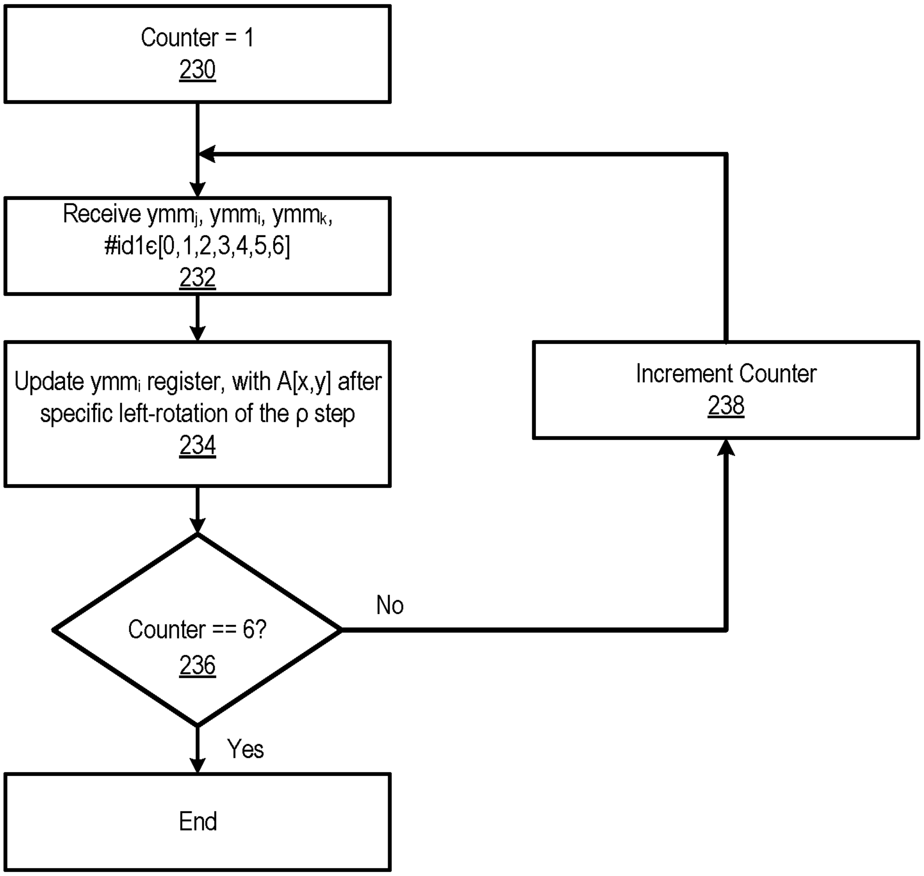
FIG. 2D is a flowchart illustrating operations in a method to execute a transform operation for a SHA-3 computation, in accordance with some examples.

FIG. 2D is a flowchart illustrating operations in a method to execute a SHA3-TXR1 computation, in accordance with some examples. Referring to FIG. 2D, at operation 230 a counter is initialized to 1. At operation 232 the operands $ymm_i$, $ymm_j$, $ymm_k$, #id1∈[1, 2, 3, 4, 5, 6] are received as inputs, as described above. At operation 234 the parity value is calculated as the XOR of five words (4 of $ymm_i$ and the $k^{th}$ word of $ymm_j$). At operation 216 the $ymm_i$ register is updated with A[x,y] after specific left-rotation of the ρ-step as described above. If, at operation 216 the counter has not increased to 5 then operation 238 is implemented and the counter is incremented and operations 232-234 are repeated until the counter reaches 6, thereby completing the six invocations of the SHA3-TXR required, as described above.

A second instruction (SHA3-TXR2) may be defined as follows:

SHA3-TXR2:

Input: $ymm_i$, $ymm_j$, $ymm_x$, #id2

Output: updated $ymm_i$ register, where #id2 represents two things:

I. Left and right parities [1, r] for corresponding 4 words in $ymm_i$. The words [$ymm_{8\_3}$, $ymm_{8\_2}$, $ymm_{8\_1}$, $ymm_{8\_0}$, $ymm_{7\_0}$] are numerically represented by [4,3, 2,1,0].

II. Number for left rotation for each word [3,2,1, and 0] after XORing the word with parities We need only one invocations of this instruction to update $ymm_6$:

1. SHA3-TXR2($ymm_6$, $ymm_8$, $ymm_7$, #1), where #id2 in above instruction is: #1: [[0,2], [1,3], [2,4], [3,0]] [1, 62, 28,27].

Figure 2E:
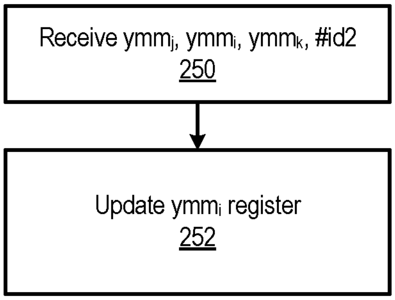
FIG. 2E is a flowchart illustrating operations in a method to execute a transform operation for a SHA-3 computation, in accordance with some examples.

FIG. 2E is a flowchart illustrating operations in a method to execute a SHA3-TXR2 computation, in accordance with some examples. Referring to FIG. 2E, at operation 250 the operands $ymm_i$, $ymm_j$, $ymm_k$, #id2 are received as inputs, as described above. At operation 252 the $ymm_i$ register is updated as described above.

The next part of the KECCAK permutation is the Pi (π) step, which may be computed through data rearrangement in the ymm; register. In some examples a SHA3-PI) may be defined to compute these parities, as follows:

SHA3-PI

Input: $ymm_i$, $ymm_{i+1}$, $ymm_{i+2}$, k is a 8-bit number

Minimum requirement: move one 64-bit word of $ymm_{i+1}$ and one from $ymm_{i+2}$ to two consecutive words in $ymm_i$ Output: updated $ymm_i$ Possible computation:

$$i_1 = k_{7-6};\ i_2 = k_{3-2};\ s_1 = k_{5-4};\ s_2 = k_{1-0}$$

$$ymm_i[s_1] = ymm_{i+1}[s_2];$$

$$ymm_i[(s_1 + i_1)\ \%\ 4] = ymm_{i+2}[(s_2 + i_2)\ \%\ 4].$$

In some examples, twelve invocations of the SHA3-PI instruction are required to compute Pi (π) step by performing the following data rearrangement:

1. SHA3-PI ($ymm_{10}$, $ymm_6$, $ymm_6$, 0x94)
2. SHA3-PI ($ymm_{10}$, $ymm_6$, $ymm_6$, 0x86)
3. SHA3-PI ($ymm_{11}$, $ymm_4$, $ymm_2$, 0x40)
4. SHA3-PI ($ymm_{11}$, $ymm_0$, $ymm_3$, 0x60)
5. SHA3-PI ($ymm_{12}$, $ymm_0$, $ymm_3$, 0x41)
6. SHA3-PI ($ymm_{12}$, $ymm_1$, $ymm_4$, 0x61)
7. SHA3-PI ($ymm_{13}$, $ymm_1$, $ymm_4$, 0x42)
8. SHA3-PI ($ymm_{13}$, $ymm_2$, $ymm_0$, 0x62)
9. SHA3-PI ($ymm_6$, $ymm_1$, $ymm_2$, 0x44)
10. SHA3-PI ($ymm_6$, $ymm_3$, $ymm_4$, 0x66)
11. SHA3-PI ($ymm_4$, $ymm_2$, $ymm_0$, 0x43)
12. SHA3-PI ($ymm_4$, $ymm_3$, $ymm_1$, 0x63)

Figure 2F:
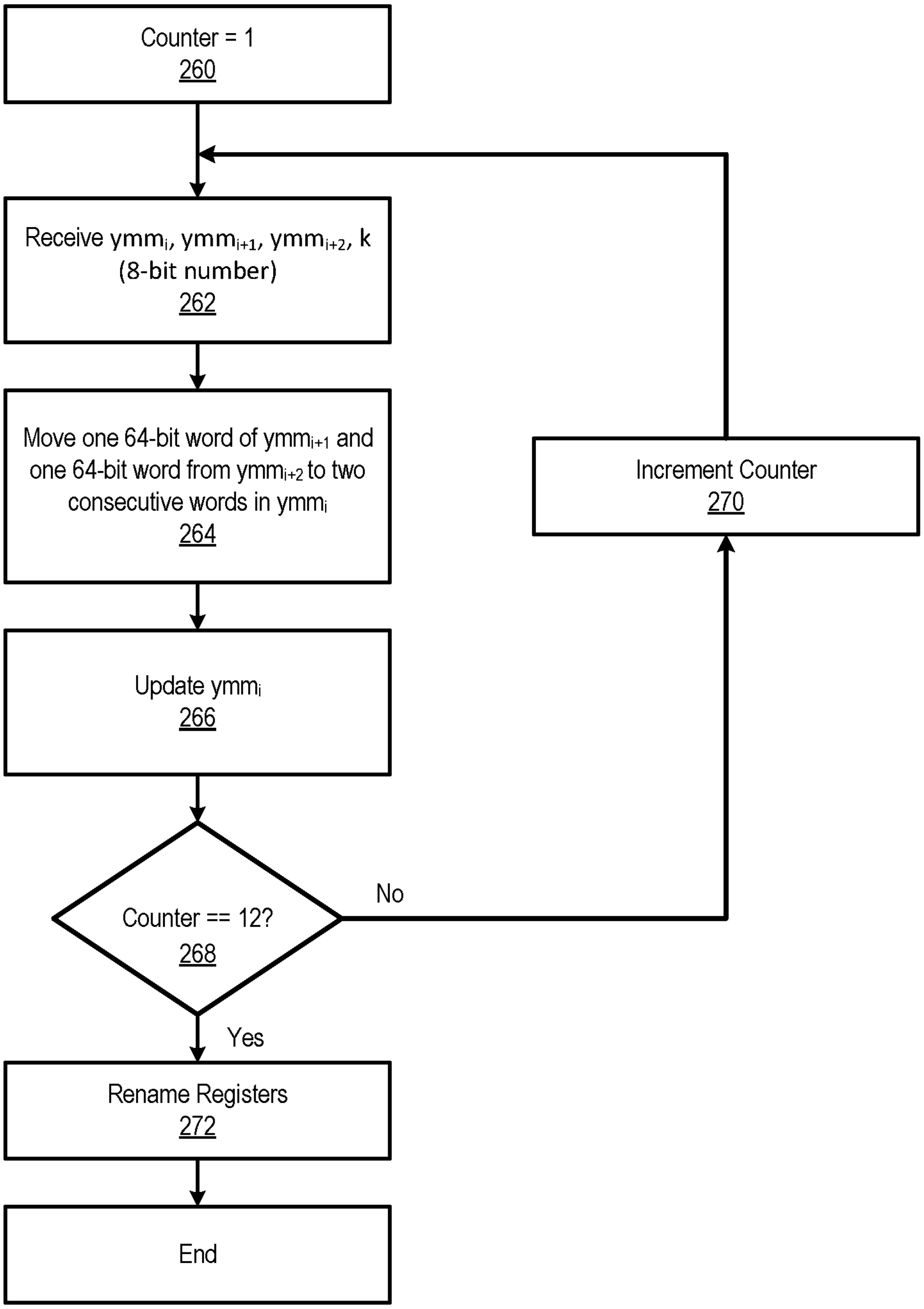
FIG. 2F is a flowchart illustrating operations in a method to execute a calculation for a SHA-3 computation, in accordance with some examples.

After the data rearrangement is complete four registers are renamed, as follows:

1. $ymm_0$=$ymm_{10}$
2. $ymm_1$=$ymm_{11}$
3. $ymm_2$=$ymm_{12}$
4. $ymm_3$=$ymm_{13}$ FIG. 2F is a flowchart illustrating operations in a method to execute a SHA3-PI computation, in accordance with some examples. In some examples, the PI step may be implemented by rearranging the data in the ymm register. Referring to FIG. 2F, at operation 260 a counter is initialized to 1. At operation 262 the operands $ymm_i$, $ymm_{i+1}$, $ymm_{i+2}$, k (an 8-bit number) are received as inputs. At operation 264 the data is rearranged by moving at least one 64-bit word of $ymm_{i+1}$ and one from $ymm_{i+2}$ to two consecutive words in $ymm_i$. At operation 266 the $ymm_j$ register is updated with the data movement from operation 264. If, at operation 268 the counter has not increased to 12 then operation 270 is implemented and the counter is incremented and operations 262-266 are repeated until the counter reaches 12, thereby completing the twelve invocations of the SHA3-PI instruction required, as described above. After the twelve invocations of the SHA3-PI instruction are completed operation 272 is implemented and the registers are renamed, as described above.

Figure 3A:
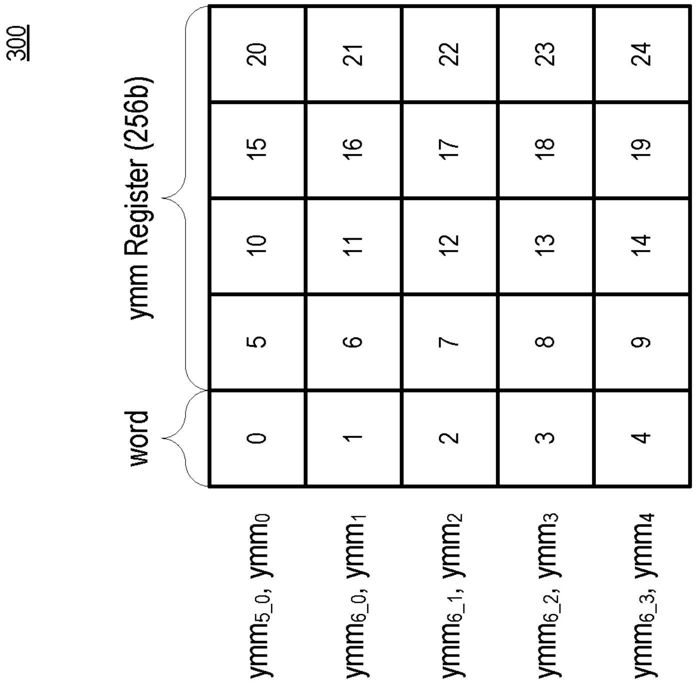
FIG. 3A is a schematic block diagram illustrating word positions in a register during a SHA-3 computation, in accordance with some examples.
Figure 3B:
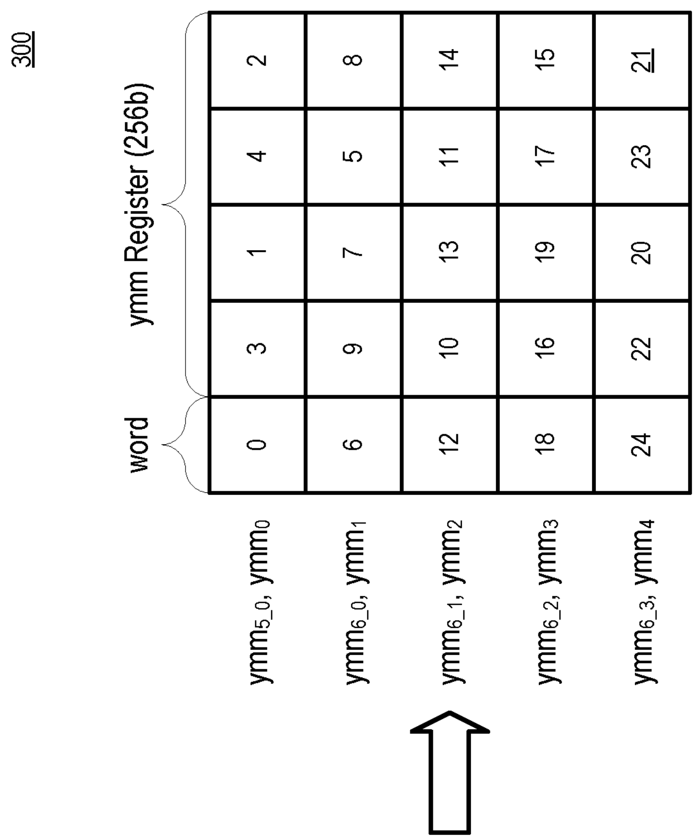
FIG. 3B is a schematic block diagram illustrating word positions in a register during a SHA-3 computation, in accordance with some examples.

The data rearrangement operation is illustrated in FIGS. 3A and 3B. FIG. 3A is a schematic block diagram illustrating word positions in the register 300 before the SHA3-PI instruction is completed, and FIG. 3B is a schematic block diagram illustrating word positions in the register after the SHA3-Pi instruction is completed, in accordance with some examples.

The next part of the KECCAK permutation is the Chi (χ) step, which computes the XOR-NOT-AND on three words and updates the first word as defined in the following equation:

$$A[x, y] = A[x, y] \oplus ((\neg A[x+1, y]\ \&\ A[x, +2, y]), \forall (x, y) \text{ in } (0 \ldots 4, 0 \ldots 4)$$

In some examples the Chi (χ) step may be computed using two instructions, which operate on the register state represented in FIG. 3B. The first instruction is a SHA3-CHI1 instructions, which may be defined, as follows:

SHA3-CHI1

Input: $ymm_i$, $ymm_{i+1}$, $ymm_{i+2}$

Output: updated $ymm_i$=$ymm_i$ XOR (NOT ($ymm_{i+1}$) AND $ymm_{i+2}$)

We need following four invocations of SHA3-CHI1 along with the existing andnot and xor instructions to update ymm register 0, 1, 2, 3 and 4.

1. andnot ($ymm_7$, $ymm_4$, $ymm_0$)
2. SHA3-CHI1 ($ymm_0$, $ymm_1$, $ymm_2$)
3. SHA3-CHI1 ($ymm_2$, $ymm_3$, $ymm_4$)
4. SHA3-CHI1 ($ymm_4$, $ymm_0$, $ymm_1$)
5. SHA3-CHI1 ($ymm_1$, $ymm_2$, $ymm_3$)
6. xor($ymm_3$, $ymm_3$, $ymm_7$)

A second instruction is a SHA3-CHI2 instruction, which may be defined as follows:

SHA3-CHI2

Input: $ymm_i$, $ymm_{i+1}$, $ymm_{i+2}$, k=[0, 1]

Output: updated ymm; register

Two invocations of SHA3-CHI2 instruction are required for updating ymm registers 5 and 6 to compute $\chi$-Step:

1. SHA3-CHI2 ($ymm_5$, $ymm_5$, $ymm_6$, 0)
2. SHA3-CHI2 ($ymm_6$, $ymm_5$, $ymm_6$, 1), where k=0 represents an update of the first word in $ymm_5$ and stores old value in second word of $ymm_5$. Similarly, k=1 indicates to update all 4 words in $ymm_6$ considering word numbers [0, 1, 2, 3, 4] are represented by $ymm_{5\_1}$, $ymm_{6\_0}$, $ymm_{6\_1}$, $ymm_{6\_2}$ and $ymm_{6\_3}$.

Figure 4A:
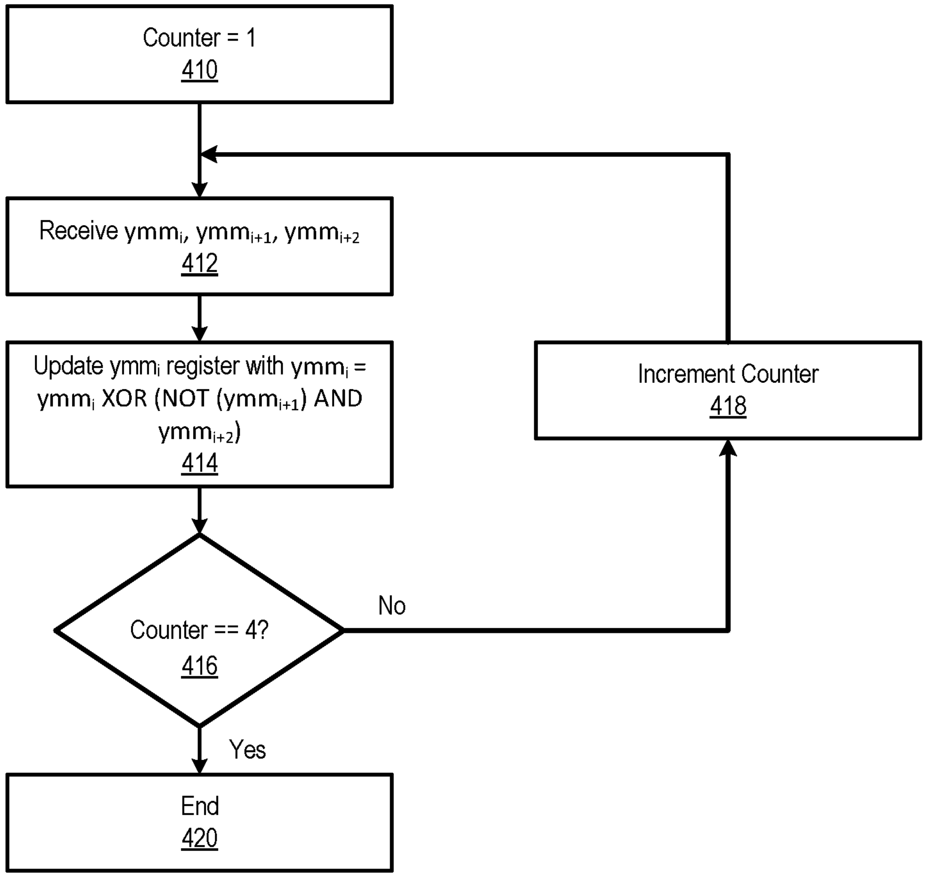
FIG. 4A is a flowchart illustrating operations in a method to execute a calculation for a SHA-3 computation, in accordance with some examples.

FIG. 4A is a flowchart illustrating operations in a method to execute a SHA3-CHI1 computation, in accordance with some examples. In some examples, the CHI1 step may be implemented by performing an XOR-NOT-AND operation. Referring to FIG. 4A, at operation 410 a counter is initialized to 1. At operation 412 the operands $ymm_i$, $ymm_{i+1}$, $ymm_{i+2}$ are received as inputs. At operation 414 the $ymm_i$ register is updated with the value $ymm_i$=$ymm_i$ XOR (NOT ($ymm_{i+1}$) AND $ymm_{i+2}$) If, at operation 416 the counter has not increased to four (4) then operation 418 is implemented and the counter is incremented and operations 412-414 are repeated until the counter reaches four (4), thereby completing the four invocations of the SHA3-CHI1 instruction required, as described above.

Figure 4B:
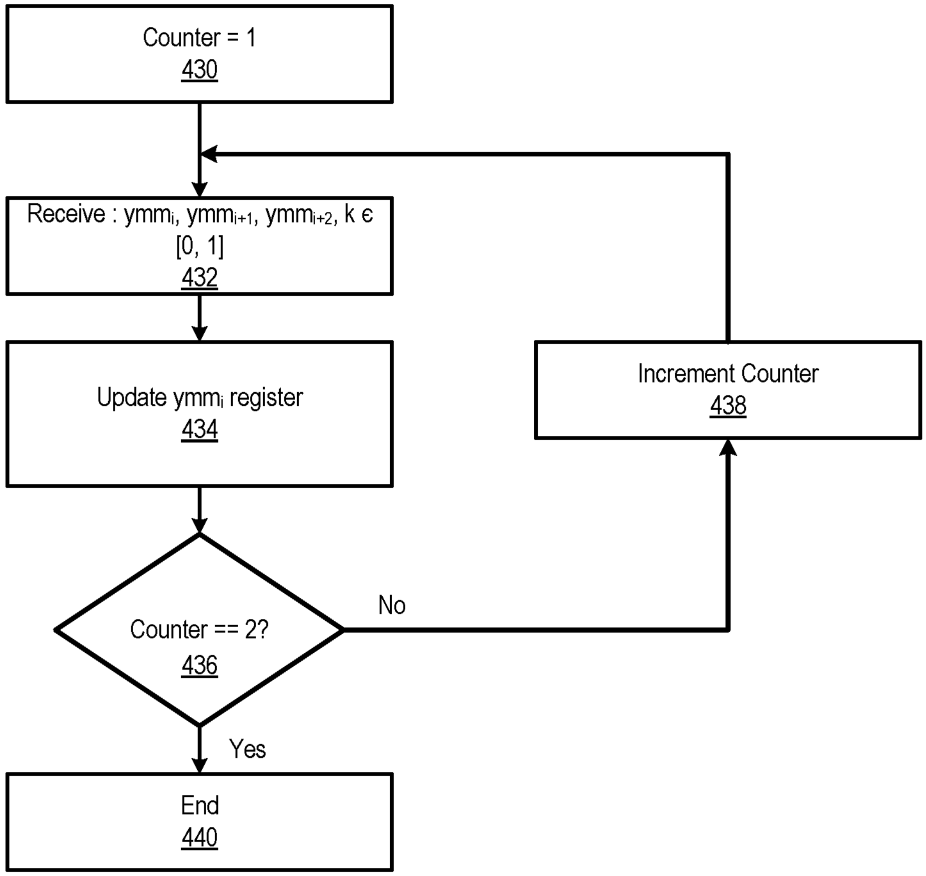
FIG. 4B is a flowchart illustrating operations in a method to execute a transform operation for a SHA-3 computation, in accordance with some examples.

FIG. 4B is a flowchart illustrating operations in a method to execute a SHA3-CHI2 computation, in accordance with some examples. In some examples, the CHI2 step may be implemented by updating the ymm; register as described above. Referring to FIG. 4B, at operation 450 a counter is initialized to 1. At operation 432 the operands $ymm_i$, $ymm_{i+1}$, $ymm_{i+2}$, k∈[0, 1] are received as inputs. At operation 434 the $ymm_i$ register is updated, as described above. If, at operation 436 the counter has not increased to two (2) then operation 438 is implemented and the counter is incremented and operations 432-444 are repeated until the counter reaches two (4), thereby completing the four invocations of the SHA3-CHI2 instruction required, as described above.

Figure 4C:
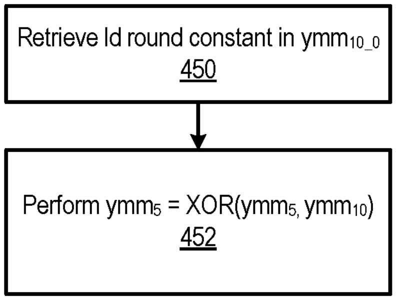
FIG. 4C is a flowchart illustrating operations in a method to execute a transform operation for a SHA-3 computation, in accordance with some examples.

The next part of the KECCAK permutation is the Iota ($\iota$) step, which may be computed by performing an XOR operation on the round constant with the $0^{th}$ word of the state, which is stored in the $0^{th}$ word of register $ymm_5$ in FIG. 2A. FIG. 4C is a flowchart illustrating operations in a method to execute a transform operation for the Iota ($\iota$) step, in accordance with some examples. Referring to FIG. 4C, at operation 450 the Id round constant in $ymm_{10\_0}$ is retrieved. At operation 452 the register $ymm_5$ is updated by performing $ymm_5$=XOR($ymm_5$, $ymm_{10}$).

Figure 5:
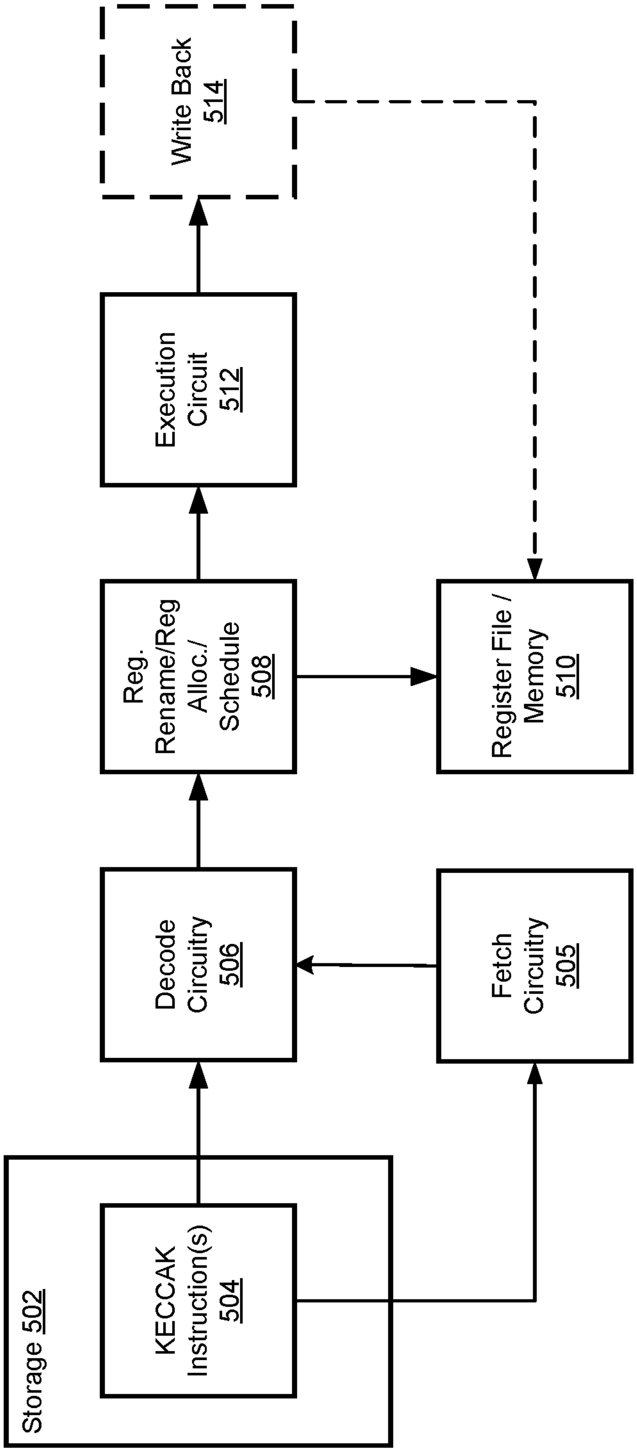
FIG. 5 is a schematic, block diagram illustration of components that may be used to implement a SHA-3 operations in accordance with some examples

FIG. 5 is a schematic, block diagram illustration of is a schematic illustration of a components that may be used to implement a KECCAK operation in accordance with some examples. Referring to FIG. 5, storage 502 may comprise one or more KECCAK instructions 504 to be executed. The KECCAK instruction(s) 504 may be received by decode circuitry 506. For example, the decode circuitry 506 receives this instruction from fetch logic/circuitry 505. The KECCAK instruction 504 includes fields for an opcode, a first source identifier, a second source identifier, a third source identifier, a first destination identifier, and a second destination identifier. In some embodiments, the source[s] and destination(s) may be implemented as registers, and in other embodiments one or more are memory locations. More detailed embodiments of at least one instruction format will be detailed below. The decode circuitry 506 decodes the instruction into one or more operations. In some embodiments, this decoding may include generating a plurality of micro-operations to be performed by execution circuitry (such as execution circuitry 512). The decode circuitry 506 also decodes instruction prefixes (if used).

In some embodiments, register renaming, register allocation, and/or scheduling circuitry 508 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers and/or memory 508 store data as operands of the instruction to be operated on by execution circuitry 512. Exemplary register types include packed data registers, general purpose registers, and floating point registers.

Execution circuitry 512 executes the decoded KECCAK instruction(s)n. Exemplary detailed execution circuitry is shown in FIG. 2A-2E and FIG. 4A-4C. The execution of the decoded KECCAK instruction(s) 504 causes the execution circuitry 512 to retrieve operands to perform a KECCAK operation.

Write back (retirement) circuitry 514 commits the result of the execution of the decoded KECCAK instruction(s). Write back (i.e., retirement) circuitry 514 is optional, at least insofar as it represents functionality that can occur at a different time, at a different stage of the processor's pipeline, or not at all.

Having described various hardware and data structures useful to a KECCAK operation in accordance with some examples, various operations in methods to accelerate post-quantum cryptography operations in accordance with some examples will be described with reference to FIG. 6A and FIG. 6B. In some examples the operations depicted in FIG. 6A and FIG. 6B may be implemented by the processor components depicted in FIG. 5.

Figure 6A:
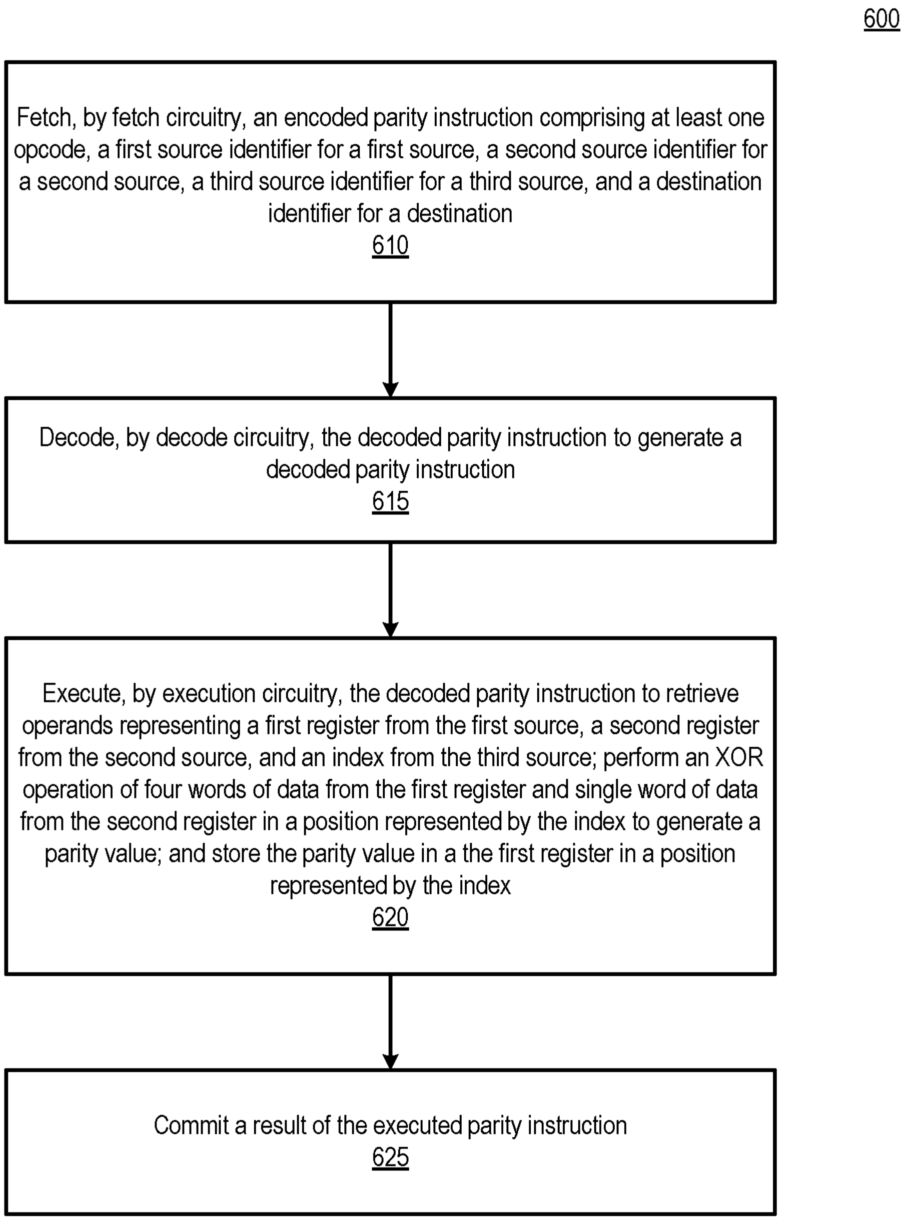
FIG. 6A is a flowchart illustrating operations in a method to execute a SHA-3 operation, in accordance with some examples.

FIG. 6A is a flowchart illustrating operations in a method to execute a parity operation, in accordance with some examples. Referring to FIG. 6A at operation 610 the instruction is fetched by fetch circuitry. For example, a parity instruction as described above may be fetched. The parity instruction may include fields for an opcode, a first source identifier, a second source identifier, a third source identifier, and a destination identifier. In some embodiments, the instruction is fetched from an instruction storage. In some examples, the source identifiers and destination identifiers may identify a packed data vector register.

At operation 615 the fetched instruction is decoded by decode circuitry to generate a decoded parity instruction. For example, the fetched parity instruction is decoded by decode circuitry as described herein.

At operation 620, the decoded instruction is executed by execution circuitry (hardware) such as that detailed herein. For the decoded parity instruction, the execution will cause execution circuitry to retrieve operands representing a first register from the first source, a second register from the second source, and an index from the third source; perform an XOR operation of four words of data from the first register and single word of data from the second register in a position represented by the index to generate a parity value; and store the parity value in a the first register in a position represented by the index. At operation 625 the result of the executed parity instruction is committed.

Figure 6B:
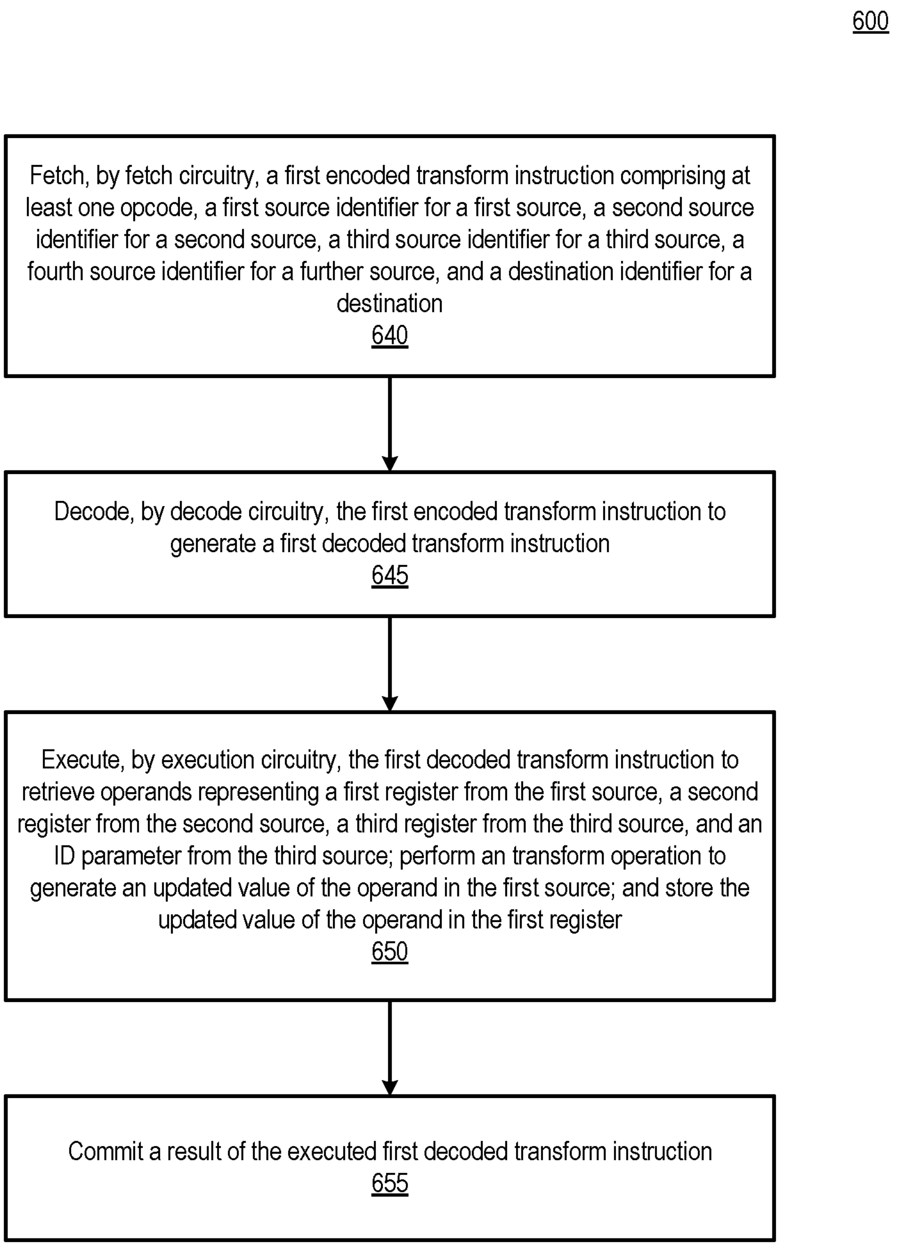
FIG. 6B is a flowchart illustrating operations in a method to execute a SHA-3 operation, in accordance with some examples.

FIG. 6B is a flowchart illustrating operations in a method to execute a transform instruction, in accordance with some examples. Referring to FIG. 6B, at operation 640 the instruction is fetched by fetch circuitry. For example, any of the transform instructions described above may be fetched. The transform instruction includes fields for an opcode, a first source identifier, a second source identifier, a third source identifier, and a destination identifier. In some embodiments, the instruction is fetched from an instruction storage. In some examples, the source identifiers and destination identifiers may identify a packed data vector register. In some examples, the source identifiers and destination identifiers may identify a packed data vector register.

At operation 645 the fetched instruction is decoded by decode circuitry to generate a decoded transform instruction. For example, the fetched transform instruction is decoded by decode circuitry as described herein.

At operation 650, the decoded instruction is executed by execution circuitry (hardware) such as that detailed herein. For the decoded transform instruction, the execution will cause execution circuitry to retrieve operands representing a first register from the first source, a second register from the second source, a third register from the third source, and an ID parameter from the third source; perform an transform operation to generate an updated value of the operand in the first source; and store the updated value of the operand in the first register. At operation 655 a result of the executed transform operation is committed.

Exemplary instruction formats are further illustrated and described below with reference to FIG. 7A to FIG. 7C, which illustrate an exemplary AVX instruction format, including a VEX prefix 702, real opcode field 730, Mod R/M byte 740, SIB byte 750, displacement field 762, and IMM8 772. Comparing FIG. 6 to FIGS. 7A-C, first source identifier 606 in some embodiments of AVX instruction format, occupies the register field 744, second source identifier 608 occupies the R/M field 746, and destination identifier 604 occupies the VEX.vvvv field 720.

In some embodiments, the VPMULUWR instruction includes a field for a writemask register operand (k) (e.g., VPMULUWR{k} DSTREG, SRC1, SRC2). A writemask is used to conditionally control per-element operations and updating of results. Depending upon the implementation, the writemask uses merging or zeroing masking. Instructions encoded with a predicate (writemask, write mask, or k register) operand use that operand to conditionally control per-element computational operation and updating of result to the identified destination. The predicate operand is known as the opmask (writemask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword (int32), double-precision floating-point (float64), integer quadword (int64). The length of an opmask register, MAX KL, is sufficient to handle up to 64 elements with one bit per element, i.e. 64 bits. For a given vector length, each instruction accesses only the number of least significant mask bits that are needed based on its data type. An opmask register affects an instruction at per-element granularity. So, any numeric or non-numeric operation of each data element and per-element updates of intermediate results to the identified destination are predicated on the corresponding bit of the opmask register. In most embodiments, an opmask serving as a predicate operand obeys the following properties: 1) the instruction's operation is not performed for an element if the corresponding opmask bit is not set (this implies that, for instructions that check for faults and raise exceptions, no exception or violation can be caused by an operation on a masked-off element, and consequently, no exception flag is updated as a result of a masked-off operation); 2) a destination element is not updated with the result of the operation if the corresponding writemask bit is not set. Instead, the destination element value must be preserved (merging-masking) or it must be zeroed out (zeroing-masking); 3) for some instructions with a memory operand, memory faults are suppressed for elements with a mask bit of 0. Note that this feature provides a versatile construct to implement control-flow predication as the mask in effect provides a merging behavior for vector register destinations. As an alternative, the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand includes an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand includes an encoding identifying an index register. Each element of the index register may specify an index or offset value usable to compute, from the base address, an address of a respective destination location within a block of potential destination locations. In one embodiment, an SIB type memory operand includes an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32 {x, y, z} identifies a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64 {x, y, z} identifies a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Instruction Sets

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Formats

VEX encoding allows instructions to have more than two operands, and allows SIMD vector registers to be longer than 128-bit registers. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

Figures 7A, 7B, 7C:
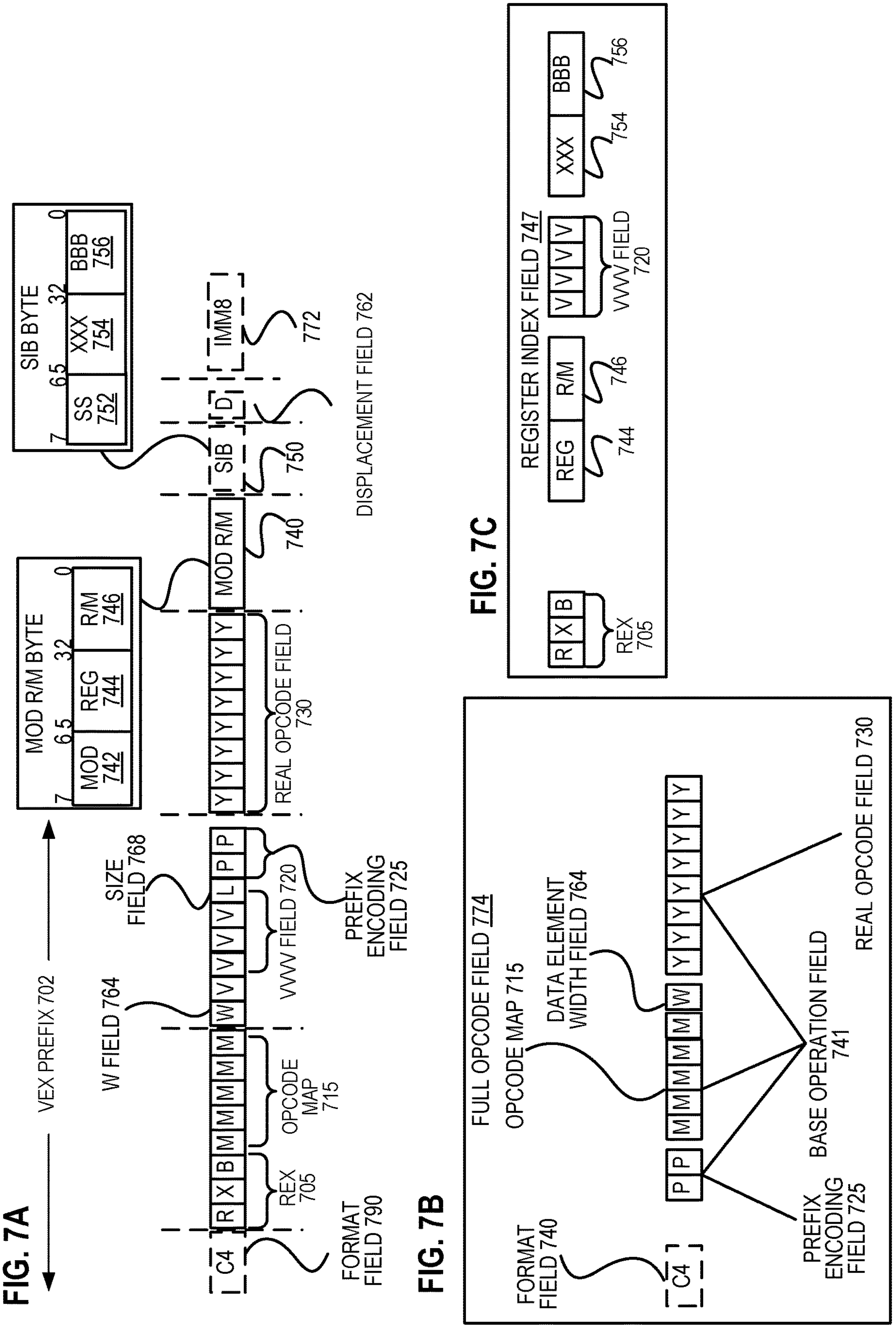
FIG. 7A is a schematic block diagram illustrating an exemplary specific vector friendly instruction format, in accordance with some examples.
FIG. 7B is a schematic block diagram illustrating fields of the specific vector friendly instruction format that make up the full opcode field, in accordance with some examples.
FIG. 7C is a schematic block diagram illustrating fields of the specific vector friendly instruction format that make up the register index field, in accordance with some examples.

FIG. 7A illustrates an exemplary AVX instruction format including a VEX prefix 702, real opcode field 730, Mod R/M byte 740, SIB byte 750, displacement field 762, and IMM8 772. FIG. 7B illustrates which fields from FIG. 7A make up a full opcode field 774 and a base operation field 741. FIG. 7C illustrates which fields from FIG. 7A make up a register index field 747.

VEX Prefix (Bytes 0-2) 702 is encoded in a three-byte form. The first byte is the Format Field 790 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 705 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit [5]-B). Other fields of the instructions encode the lower three bits of the register indexes as is known in the art (rrr, xxx, and bbb), so that Rrrr. Xxxx, and Bbbb may be formed by adding VEX.R. VEX.X, and VEX.B. Opcode map field 715 (VEX byte 1, bits [4:0]-mmmmm) includes content to encode an implied leading opcode byte. W Field 764 (VEX byte 2, bit [7]-W)—is represented by the notation VEX.W, and provides different functions depending on the instruction. The role of VEX.vvvv 720 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 768 Size field (VEX byte 2, bit [2]-L)=0, it indicates 128 bit vector; if VEX.L=1, it indicates 256 bit vector. Prefix encoding field 725 (VEX byte 2, bits [1:0]-pp) provides additional bits for the base operation field 741.

Real Opcode Field 730 (Byte 3) is also known as the opcode byte. Part of the opcode is specified in this field.

MOD R/M Field 740 (Byte 4) includes MOD field 742 (bits [7-6]), Reg field 744 (bits [5-3]), and R/M field 746 (bits [2-0]). The role of Reg field 744 may include the following: encoding either the destination register operand or a source register operand (the rrr of Rrrr), or be treated as an opcode extension and not used to encode any instruction operand. The role of R/M field 746 may include the following: encoding the instruction operand that references a memory address, or encoding either the destination register operand or a source register operand.

Scale, Index, Base (SIB)—The content of Scale field 750 (Byte 5) includes SS 752 (bits [7-6]), which is used for memory address generation. The contents of SIB.xxx 754 (bits [5-3]) and SIB.bbb 756 (bits [2-0]) have been previously referred to with regard to the register indexes Xxxx and Bbbb.

Figure 8:
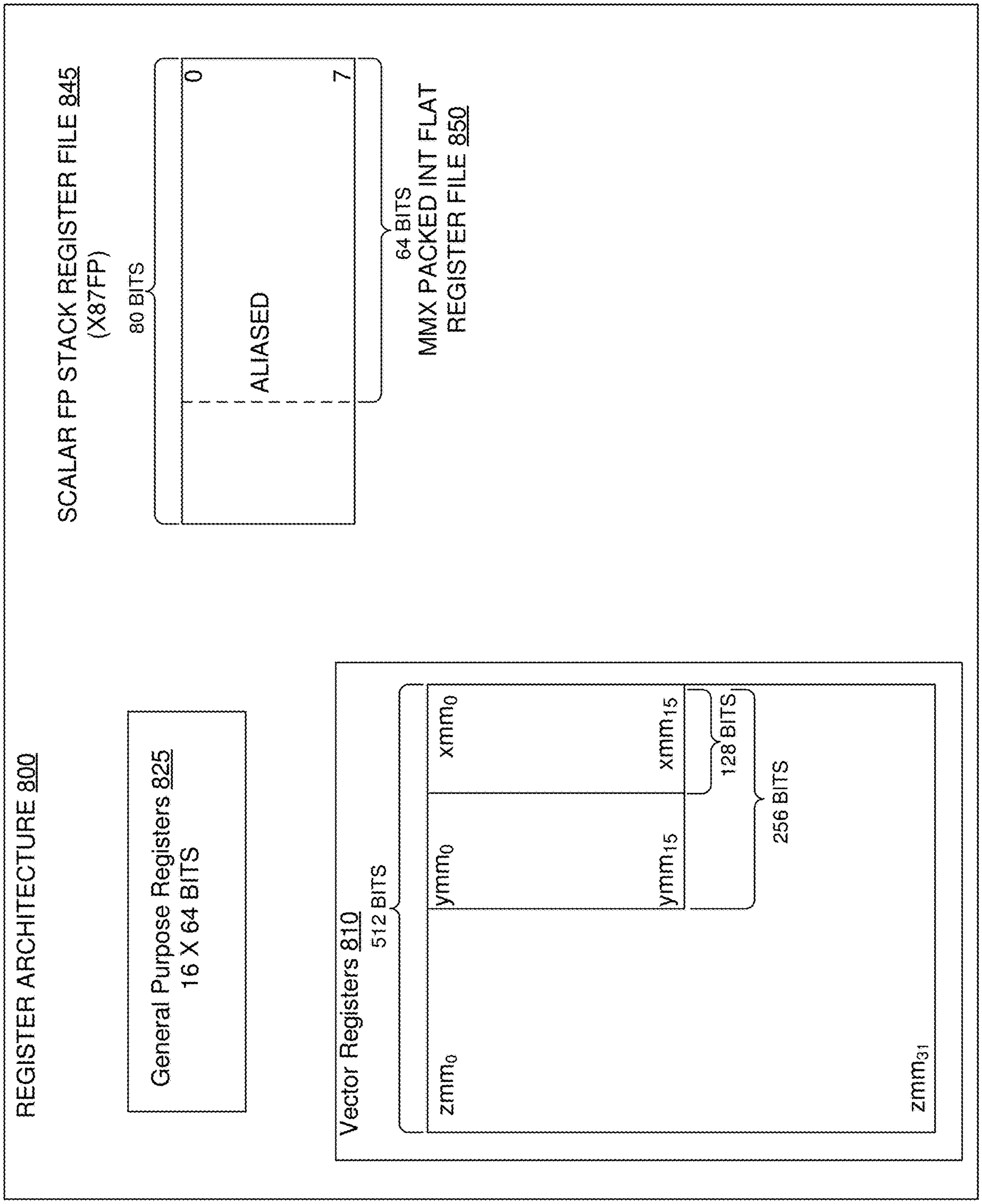
FIG. 8 is a schematic block diagram illustrating a register architecture, in accordance with some examples.

The Displacement Field 762 and the immediate field (IMM8) 772 contain data. FIG. 8 is a block diagram of a register architecture 800 according to one embodiment of the invention. In the embodiment illustrated, there are 32 vector registers 810 that are 512 bits wide; these registers are referenced as zmm0 through zmm31. The lower order 256 bits of the lower 16 zmm registers are overlaid on registers ymm0-15. The lower order 128 bits of the lower 16 zmm registers (the lower order 128 bits of the ymm registers) are overlaid on registers xmm0-15.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

In-Order and Out-of-Order Core Block Diagram

Figure 9A:
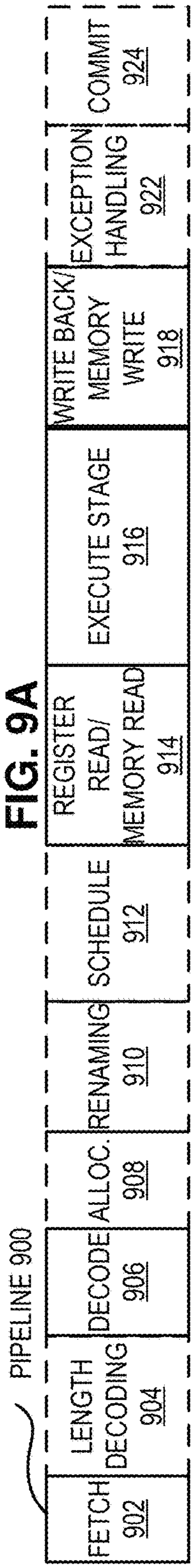
FIG. 9A is a schematic block diagram illustrating a register architecture, in accordance with some examples.
Figure 9B:
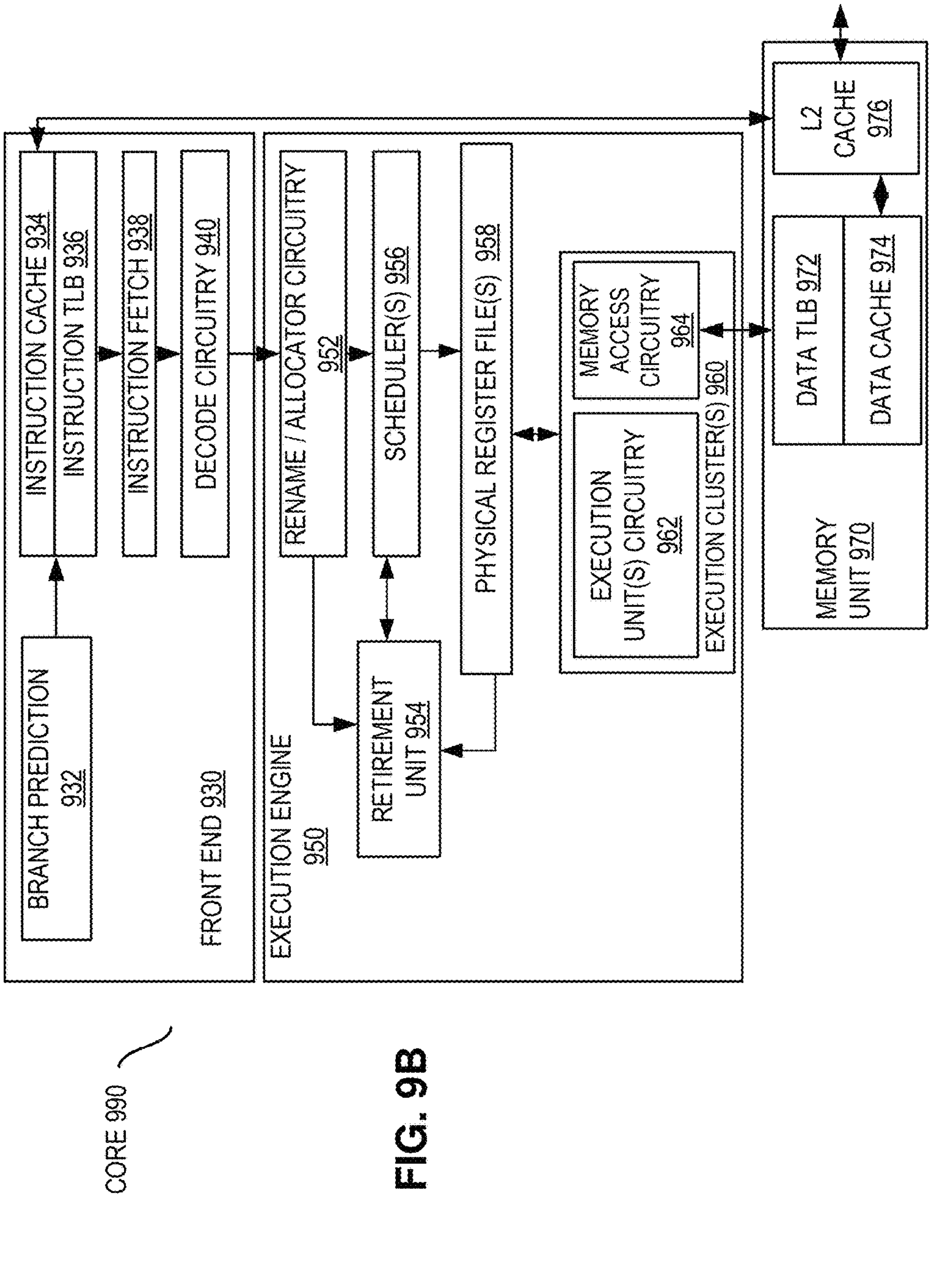
FIG. 9B is a schematic block diagram illustrating a register architecture, in accordance with some examples.

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length-decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922 (which is relevant to instructions that check for faults and generate exceptions), and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Some embodiments include one or more digital signal processors (DSP) as part of execution units 962. The scheduler unit(s) 956 may schedule one or more micro-operations, micro-code entry points, microinstructions, other instructions, or other control signals derived from an instruction, to be performed by the DSP or by any of the number of execution units. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10A:
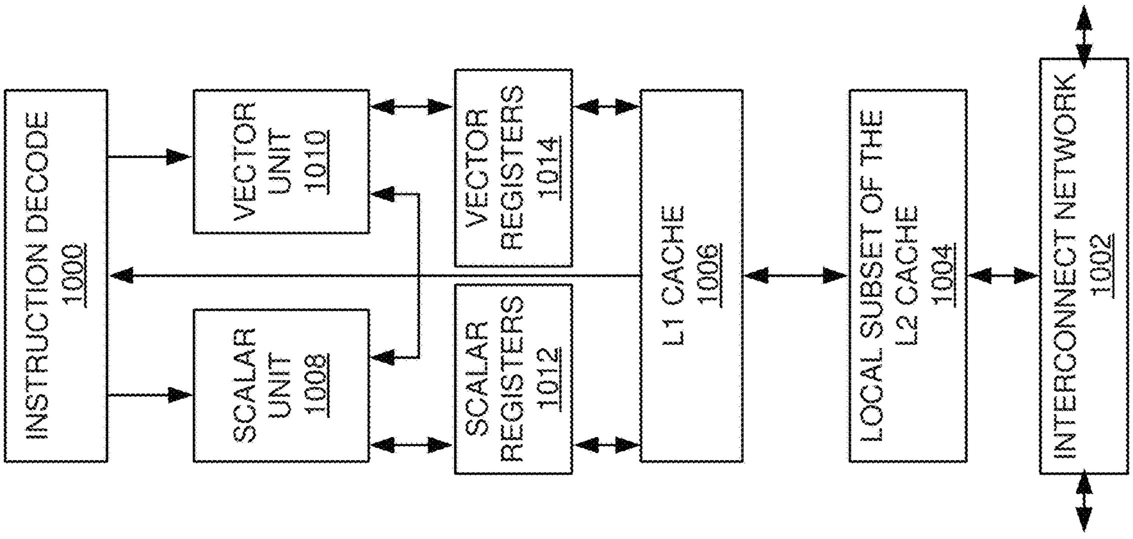
FIG. 10A is a schematic block diagram illustrating a register architecture, in accordance with some examples.
Figure 10B:
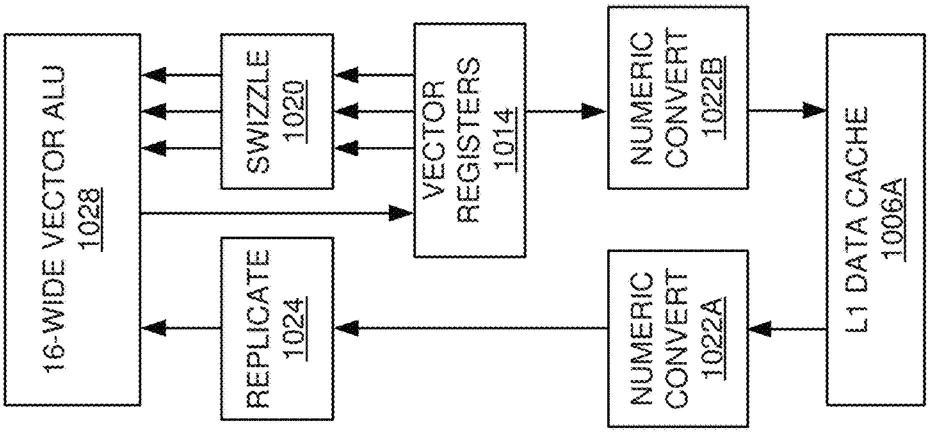
FIG. 10B is a schematic block diagram illustrating a register architecture, in accordance with some examples.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input.

Processor with Integrated Memory Controller and Graphics

Figure 11:
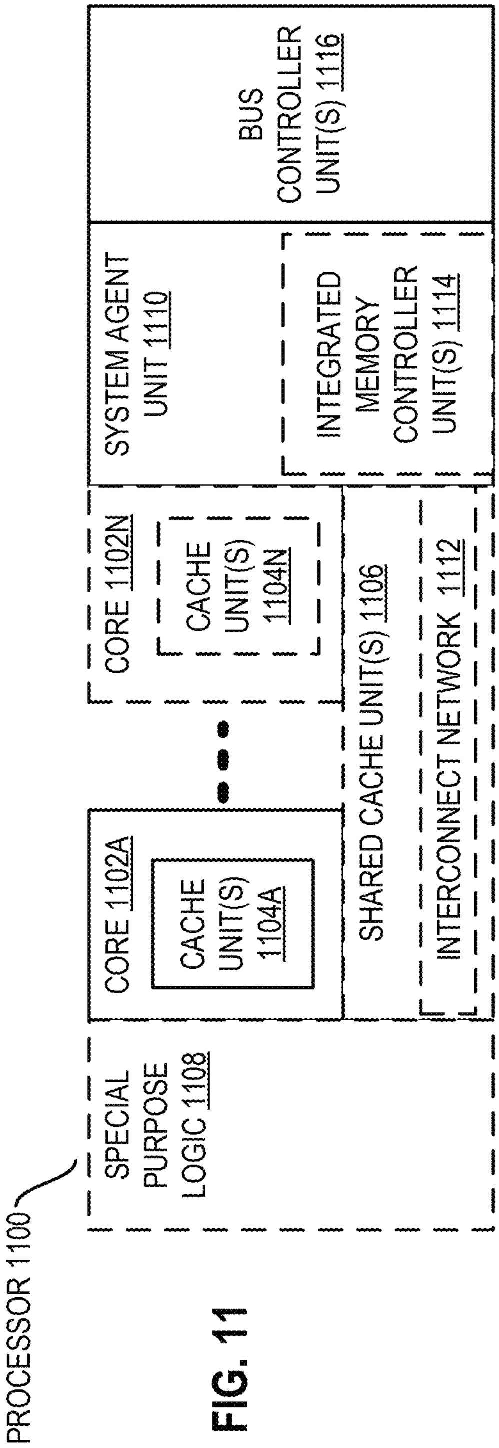
FIG. 11 is a schematic block diagram illustrating a register architecture, in accordance with some examples.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput)

logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache 1104A-N within the cores 1102A-N, a set of one or more shared cache units 1106, and external memory (not shown) coupled to the set of integrated memory controller units 1114. The set of shared cache units 1106 may include one or more mid-level caches, such as level 2 (L2), level 3 (L3), level 4 (LA), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
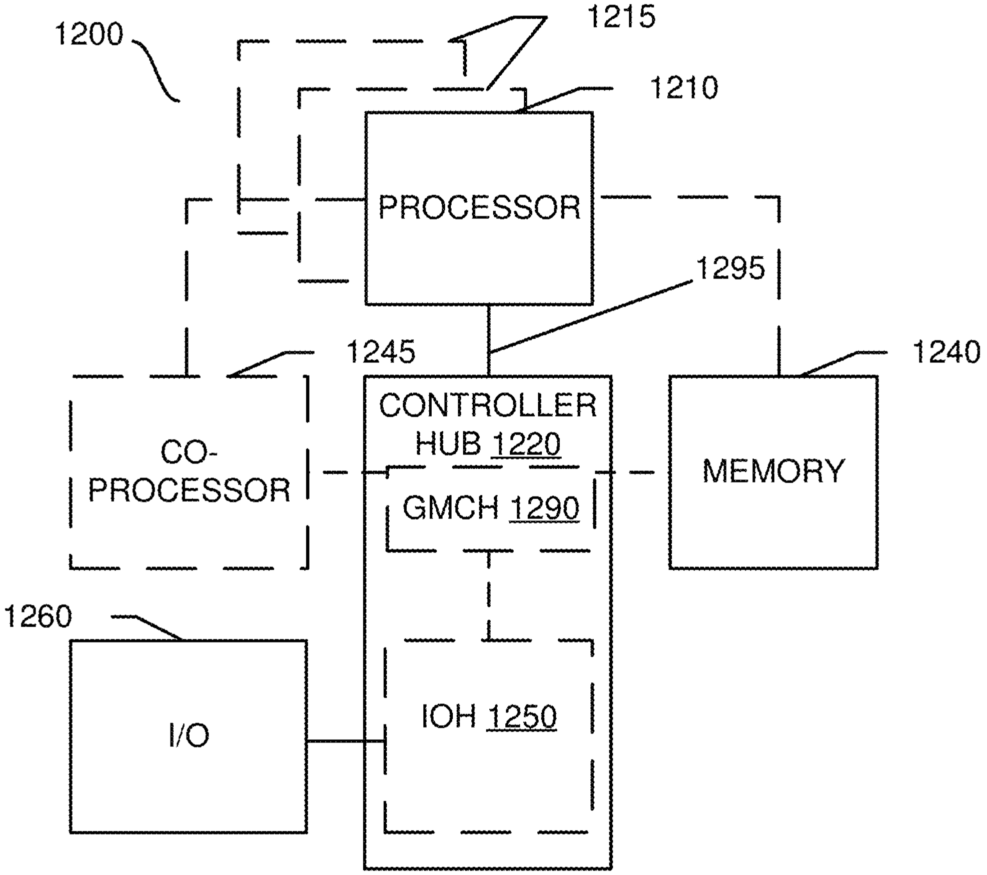
FIG. 12 is a schematic block diagram illustration of a computing architectures which may be adapted to implement execution of a KECCAK operation in accordance with some examples

Referring now to FIG. 12, shown is a block diagram of a system 1200 in accordance with one embodiment of the present invention. The system 1200 may include one or more processors 1210, 1215, which are coupled to a controller hub 1220. In one embodiment, the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface, or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
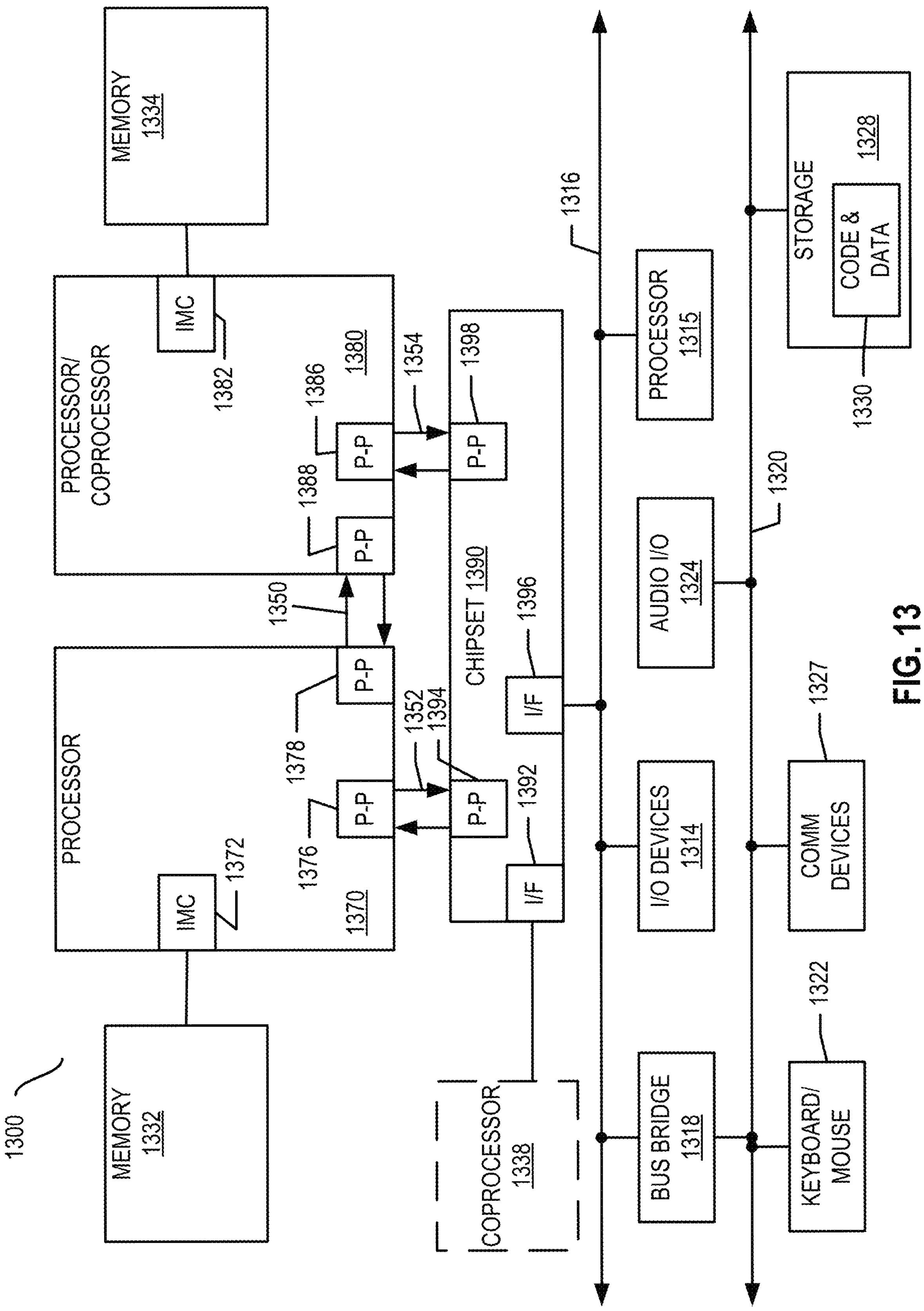
FIG. 13 is a schematic block diagram illustration of a computing architecture which may be adapted to implement execution of a KECCAK operation in accordance with some examples.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1392. In one embodiment, the coprocessor 1338 is a special-purpose processor, such as, for example, a high-throughput MIC processor, a network or communication processor, compression engine, graphics processor, GPGPU, embedded processor, or the like. A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1316. Note that other architectures are possible. For example, instead of the point-to-point architecture of FIG. 13, a system may implement a multi-drop bus or other such architecture.

Figure 14:
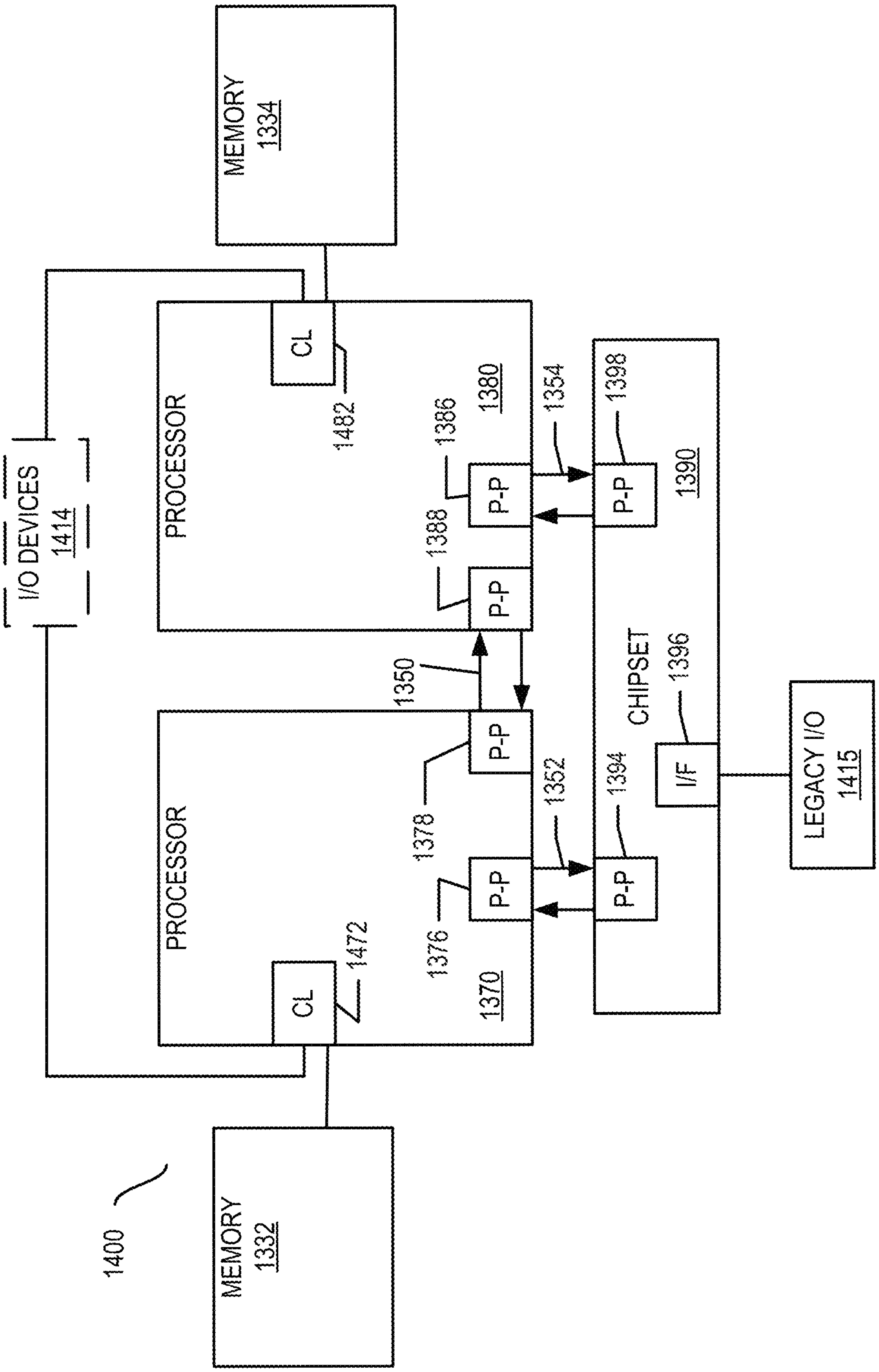
FIG. 14 is a schematic block diagram illustration of a computing architectures which may be adapted to implement execution of a KECCAK operation in accordance with some examples

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1472 and 1482, respectively. Thus, the CL 1472, 1482 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
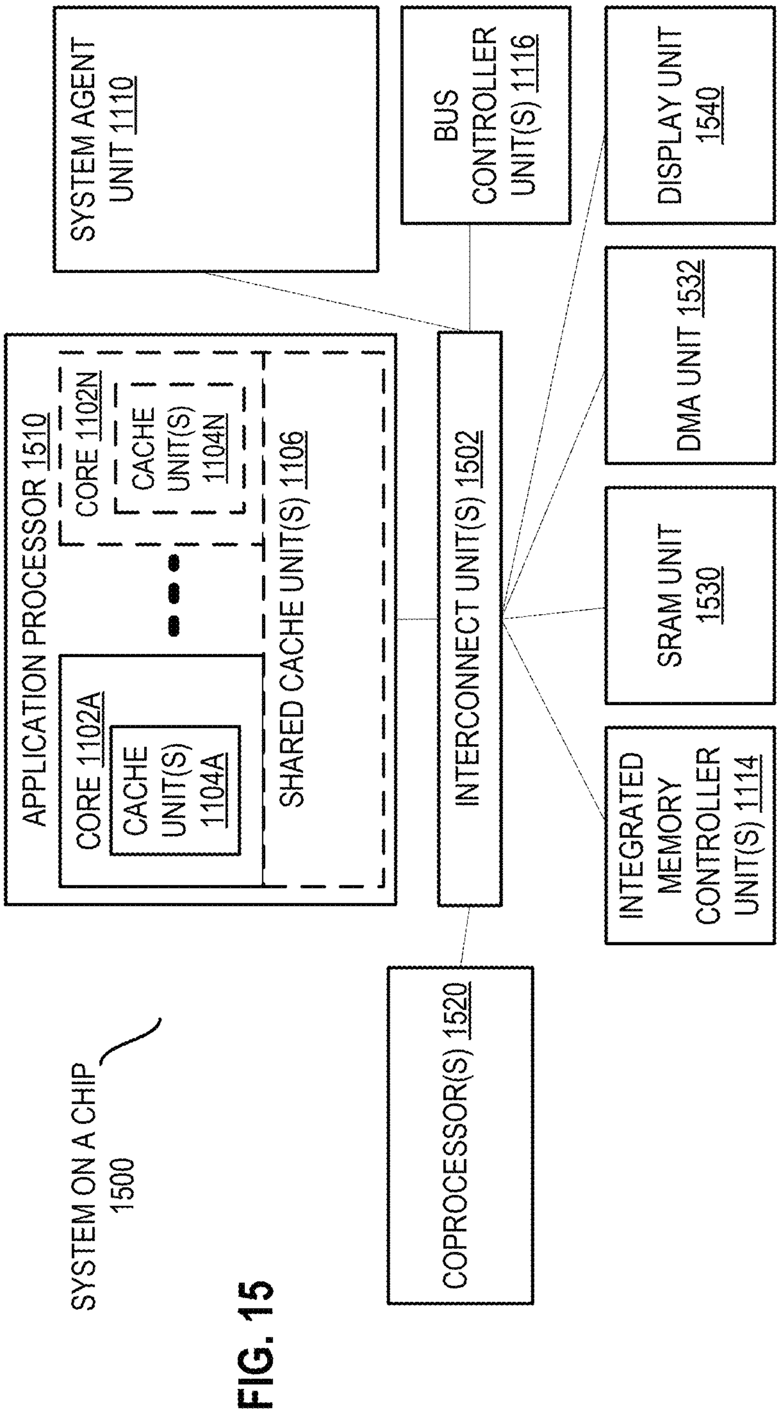
FIG. 15 is a schematic block diagram illustration of a computing architecture which may be adapted to implement execution of a KECCAK operation in accordance with some examples.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N, cache units 1104A-N, and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

The following pertains to further examples.

Example 1 is an apparatus comprising fetch circuitry to fetch an encoded parity instruction comprising at least one opcode, a first source identifier for a first source, a second source identifier for a second source, a third source identifier for a third source, and a destination identifier for a destination; decode circuitry to decode the encoded parity instruction to generate a decoded parity instruction; and execution circuitry to execute the decoded parity instruction to retrieve operands representing a first register from the first source, a second register from the second source, a third register from the third source, and an index from the third source; perform an XOR operation of four words of data from the first register and single word of data from the second register in a position represented by the index to generate a parity value; and store the parity value in the first register in a position represented by the index.

In Example 2, the subject matter of Example 1 can optionally include commit circuitry to commit a result of the executed parity instruction.

In Example 3, the subject matter of any one of Examples 1-2 can optionally include fetch circuitry to fetch a first encoded transform instruction comprising at least one opcode, a first source identifier for a first source, a second source identifier for a second source, a third source identifier for a third source, a fourth source identifier for a fourth source, and a destination identifier for a destination; decode circuitry to decode the first encoded transform instruction to generate a first decoded transform instruction; and execution circuitry to execute the first decoded transform instruction to retrieve operands representing a first register from the first source, a second register from the second source, a third register from the third source, and a fourth register from the fourth source; perform a transform instruction to generate an updated value of the operand in the first source; and store the updated value of the operand value in the first register.

In Example 4, the subject matter of any one of Examples 1-3 can optionally include commit circuitry to commit a result of the executed transform instruction.

In Example 5, the subject matter of any one of Examples 1-4 can optionally include an arrangement wherein the transform instruction is to update a register with a value of a state variable after performing a predetermined number of rotations.

In Example 6, the subject matter of any one of Examples 1-5 can optionally include an arrangement wherein the transform instruction is to move at least one 64-bit word from a first register and one 64-bit word from a second register to a consecutive position in the first register.

In Example 7, the subject matter of any one of Examples 1-6 can optionally include an arrangement wherein the transform instruction is to perform an XOR-NOT-AND operation on three words.

Example 8 is a method, comprising fetching, by fetch circuitry, an encoded parity instruction comprising at least one opcode, a first source identifier for a first source, a second source identifier for a second source, a third source identifier for a third source, and a destination identifier for a destination; decoding, by decode circuitry, the encoded parity instruction to generate a decoded parity instruction; and executing, by execution circuitry, the decoded parity instruction to retrieve operands representing a first register from the first source, a second register from the second source, a third register from the third source, and an index from the third source; perform an XOR operation of four words of data from the first register and single word of data from the second register in a position represented by the index to generate a parity value; and store the parity value in the first register in a position represented by the index.

In Example 9, the subject matter of Example 8 can optionally include committing a result of the executed parity instruction.

In Example 10, the subject matter of any one of Examples 8-9 can optionally include fetching, by fetch circuitry, a first encoded transform instruction comprising at least one opcode, a first source identifier for a first source, a second source identifier for a second source, a third source identifier for a third source, a fourth source identifier for a fourth source, and a destination identifier for a destination; decoding, by decode circuitry, the first encoded transform instruction to generate a first decoded transform instruction; and executing, by execution circuitry, the first decoded transform instruction to retrieve operands representing a first register from the first source, a second register from the second source, a third register from the third source, and a fourth register from the fourth source; perform a transform instruction to generate an updated value of the operand in the first source; and store the updated value of the operand value in the first register.

In Example 11, the subject matter of any one of Examples 8-10 can optionally include committing, by commit circuitry, a result of the executed transform instruction.

In Example 12, the subject matter of any one of Examples 8-11 wherein the transform instruction is to update a register with a value of a state variable after performing a predetermined number of rotations.

In Example 13, the subject matter of any one of Examples 8-12, wherein the transform instruction is to move at least one 64-bit word from a first register and one 64-bit word from a second register to a consecutive position in the first register.

In Example 14, the subject matter of any one of Examples 8-13, wherein the transform instruction is to perform an XOR-NOT-AND operation on three words.

Example 15 is a non-transitory computer readable medium comprising instructions which, when executed by a processor, configure the processor to fetch an encoded parity instruction comprising at least one opcode, a first source identifier for a first source, a second source identifier for a second source, a third source identifier for a third source, and a destination identifier for a destination; decode the encoded parity instruction to generate a decoded parity instruction; and execute the decoded parity instruction to retrieve operands representing a first register from the first source, a second register from the second source, a third register from the third source, and an index from the third source; perform an XOR operation of four words of data from the first register and single word of data from the second register in a position represented by the index to generate a parity value; and store the parity value in the first register in a position represented by the index.

In Example 16, the subject matter of Example 15 can optionally include the subject matter of claim 15, comprising instructions to commit a result of the executed transform instruction.

In Example 17, the subject matter of any one of Examples 15-16 can optionally include instructions to fetch a first encoded transform instruction comprising at least one opcode, a first source identifier for a first source, a second source identifier for a second source, a third source identifier for a third source, a fourth source identifier for a fourth source, and a destination identifier for a destination; decode the first encoded transform instruction to generate a first decoded transform instruction; and execute the first decoded transform instruction to retrieve operands representing a first register from the first source, a second register from the second source, a third register from the third source, and a fourth register from the fourth source; perform a transform instruction to generate an updated value of the operand in the first source; and store the updated value of the operand value in the first register.

In Example 18, the subject matter of any one of Examples 15-17 can optionally include instructions to commit a result of the executed transform instruction.

In Example 19, the subject matter of any one of Examples 15-18, wherein the transform instruction is to update a register with a value of a state variable after performing a predetermined number of rotations.

In Example 20, the subject matter of any one of Examples 15-19, wherein the transform instruction is to move at least one 64-bit word from a first register and one 64-bit word from a second register to a consecutive position in the first register.

In Example 21, the subject matter of any one of Examples 15-20, wherein the transform instruction is to perform an XOR-NOT-AND operation on three words.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B." "B but not A." and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second." "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A hardware processor, comprising:

fetch circuitry to fetch an encoded parity instruction comprising at least one opcode, a first source identifier to identify a first register, a second source identifier to identify a second register, and a third source identifier to identify a third register;

decode circuitry to decode the encoded parity instruction to generate a decoded parity instruction; and execution circuitry to execute the decoded parity instruction to:

perform an XOR operation of four words of data from the first register and a single word of data from the second register in a position represented by an index identified in the third register to generate a parity value;

and store the parity value in the first register in a position represented by the index.

2. The hardware processor of claim 1, further comprising:

commit circuitry to commit a result of the executed parity instruction.

3. A method, comprising:

fetching, by fetch circuitry, an encoded parity instruction comprising at least one opcode, a first source identifier for a first source, a second source identifier for a second source, a third source identifier for a third source, and a destination identifier for a destination;

decoding, by decode circuitry, the encoded parity instruction to generate a decoded parity instruction; and executing, by execution circuitry, the decoded parity instruction to:

retrieve respective data from the first source and from the second source;

retrieve an index from the third source;

perform an XOR operation of four words of data from the first source and a single word of data from the second source in a position represented by the index to generate a parity value; and store the parity value in the first source in a position represented by the index.

4. The method of claim 3, further comprising:

committing a result of the executed parity instruction.

5. The method of claim 3, further comprising:

fetching a first encoded transform instruction comprising at least one opcode, a fifth source identifier for a fifth source, a fourth source identifier for a fourth source, and a destination identifier for a destination for the first encoded transform instruction;

decoding the first encoded transform instruction to generate a first decoded transform instruction; and executing the first decoded transform instruction to:

retrieve respective data from the fifth source and from the fourth source;

perform a transform operation to generate an updated value of the data in the fourth source; and store the updated value in the fourth source.

6. The method of claim 5, further comprising performing:

committing a result of the executed first decoded transform instruction.

7. The method of claim 5, wherein the executing of the first decoded transform instruction is to update a register with a value of a state variable after performing a predetermined number of rotations.

8. The method of claim 5, wherein the executing of the first decoded transform instruction is to move at least one 64-bit word from the fourth source and one 64-bit word from the fifth source to consecutive positions in the fourth source.

9. The method of claim 5, wherein the executing of the first decoded transform instruction is to perform an XOR-NOT-AND operation on three words.

10. A non-transitory computer readable medium comprising instructions which, when executed by a processor, configure the processor to:

fetch an encoded parity instruction comprising at least one opcode, a first source identifier for a first source, a second source identifier for a second source, a third source identifier for a third source, and a destination identifier for a destination;

decode the encoded parity instruction to generate a decoded parity instruction; and execute the decoded parity instruction to:

retrieve respective data from the first source and from the second source;

retrieve an index from the third source;

perform an XOR operation of four words of data from the first source and a single word of data from the second source in a position represented by the index to generate a parity value; and store the parity value in the first source in a position represented by the index.

11. The non-transitory computer readable medium of claim 10, comprising instructions to:

fetch an encoded transform instruction comprising at least one opcode, a fifth source identifier for a fifth source, a fourth source identifier for a fourth source, and a destination identifier for a destination for the encoded transform instruction;

decode the encoded transform instruction to generate a decoded transform instruction; and execute the decoded transform instruction to:

retrieve respective data from the fifth source and from the fourth source;

perform a transform operation to generate an updated value of the data in the fourth source; and store the updated value in the fourth source.

12. The non-transitory computer readable medium of claim 11, comprising instructions to:

commit a result of the decoded transform instruction.

13. The non-transitory computer readable medium of claim 11, wherein an execution of the decoded transform instruction is to update a value of a state variable after performing a predetermined number of rotations.

14. The non-transitory computer readable medium of claim 11, wherein an execution of the decoded transform instruction is to move at least one 64-bit word from the fourth source and one 64-bit word from the fifth source to consecutive positions in the fourth source.

15. The non-transitory computer readable medium of claim 14, wherein an execution of the decoded transform instruction is to perform an XOR-NOT-AND operation on three words.

* * * * *